(12) United States Patent
Rhodes et al.

(10) Patent No.: US 8,001,649 B2
(45) Date of Patent: Aug. 23, 2011

(54) WIPER ASSEMBLY FOR SWEEPING A GLASS SURFACE ON A VEHICLE

(76) Inventors: Robert V. Rhodes, South Pasadena, CA (US); Kenneth A. Gross, Northridge, CA (US); Michael A. Gross, La Canada, CA (US)

( * ) Notice: Subject to any disclaimer, the term of this patent is extended or adjusted under 35 U.S.C. 154(b) by 1221 days.

(21) Appl. No.: 11/545,287

(22) Filed: Oct. 10, 2006

(65) Prior Publication Data

US 2008/0083081 A1 Apr. 10, 2008

(51) Int. Cl.
  *B60S 1/46* (2006.01)
(52) U.S. Cl. .................................. 15/250.02; 15/250.04
(58) Field of Classification Search ............... 15/250.02, 15/250.04; 324/207.25, 207.2, 207.11, 251
See application file for complete search history.

(56) References Cited

U.S. PATENT DOCUMENTS

| | | | |
|---|---|---|---|
| 3,793,670 A | 2/1974 | Riester et al. | |
| 4,516,288 A | 5/1985 | Fizyta et al. | |
| 4,517,704 A | 5/1985 | Benson | |
| 4,620,141 A * | 10/1986 | McCumber et al. | 318/483 |
| 5,602,472 A * | 2/1997 | Bergstedt et al. | 324/207.25 |
| 5,929,588 A * | 7/1999 | Shiah | 318/653 |
| 6,040,669 A * | 3/2000 | Hog | 318/480 |
| 2002/0137455 A1* | 9/2002 | Ivanov et al. | 454/157 |

* cited by examiner

*Primary Examiner* — Monica S Carter
*Assistant Examiner* — Stephanie Newton

(57) ABSTRACT

A wiper assembly for sweeping a glass surface on a vehicle. The wiper assembly includes a windshield washer assembly connected to the windshield wiper drive arm of the vehicle for controllably dispensing washer fluid directly down onto the glass surface of the vehicle. The wiper assembly also includes a novel control unit carried by the vehicle for controlling the dispensing of the washing liquid from the windshield washer assembly. Uniquely, the control unit includes a sensor that is operably associated with the pump for sensing the position of the wiper arm as it moves upwardly and downwardly relative to the glass surface and for controllably energizing the pump at selected positions of the wiper drive arm so that the washer fluid is always dispensed forwardly of the wiper blade to avoid smearing.

4 Claims, 28 Drawing Sheets

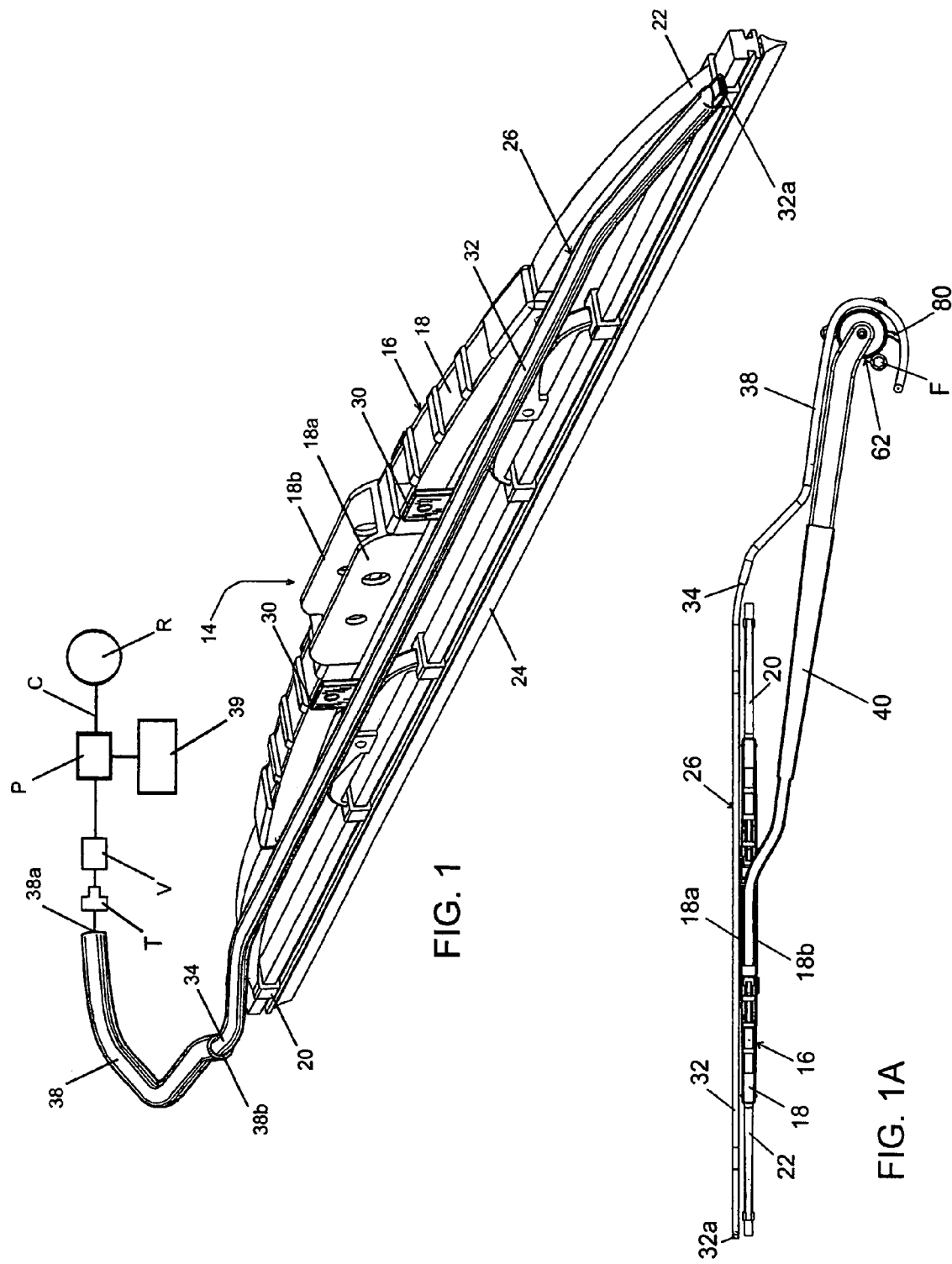

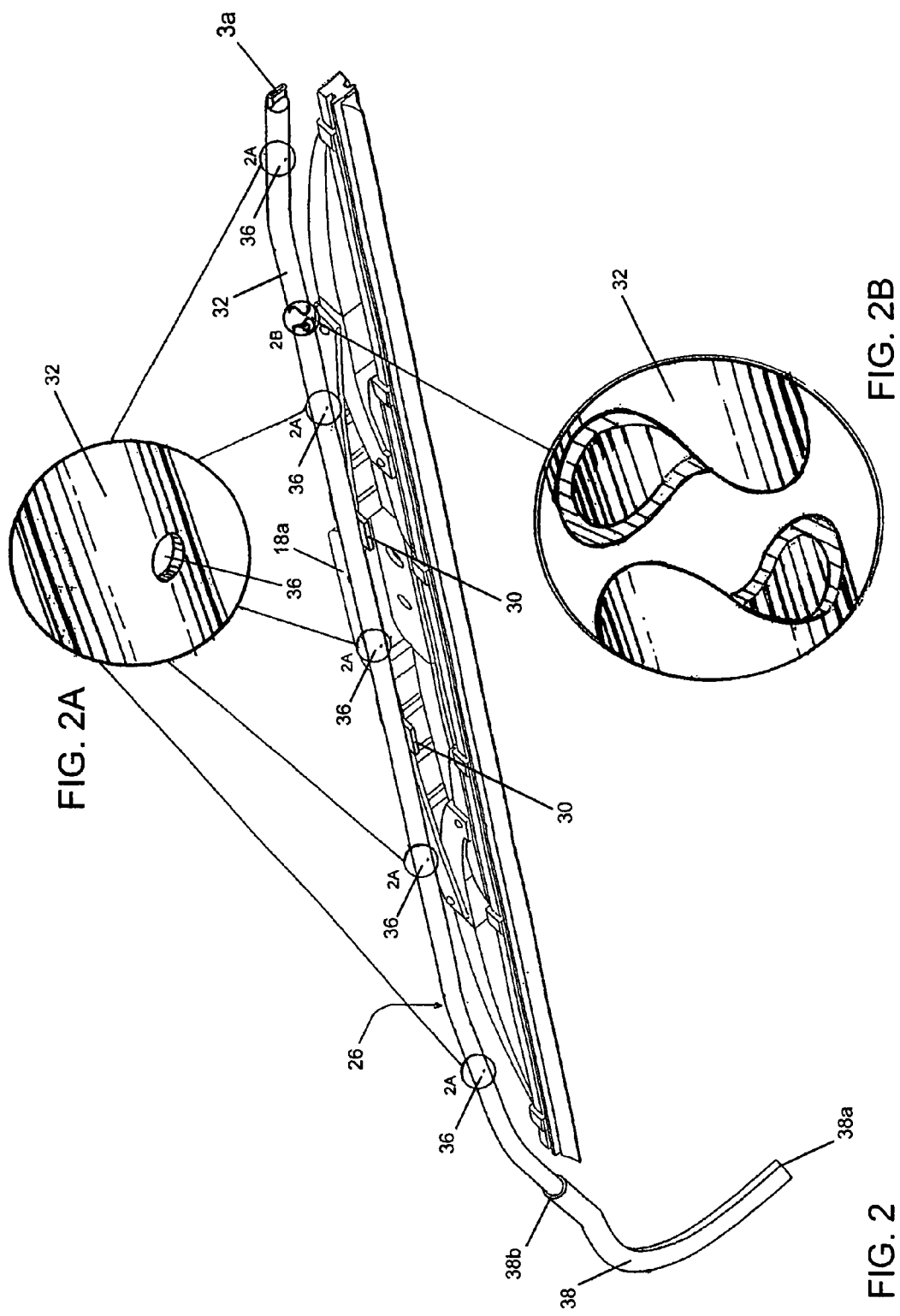

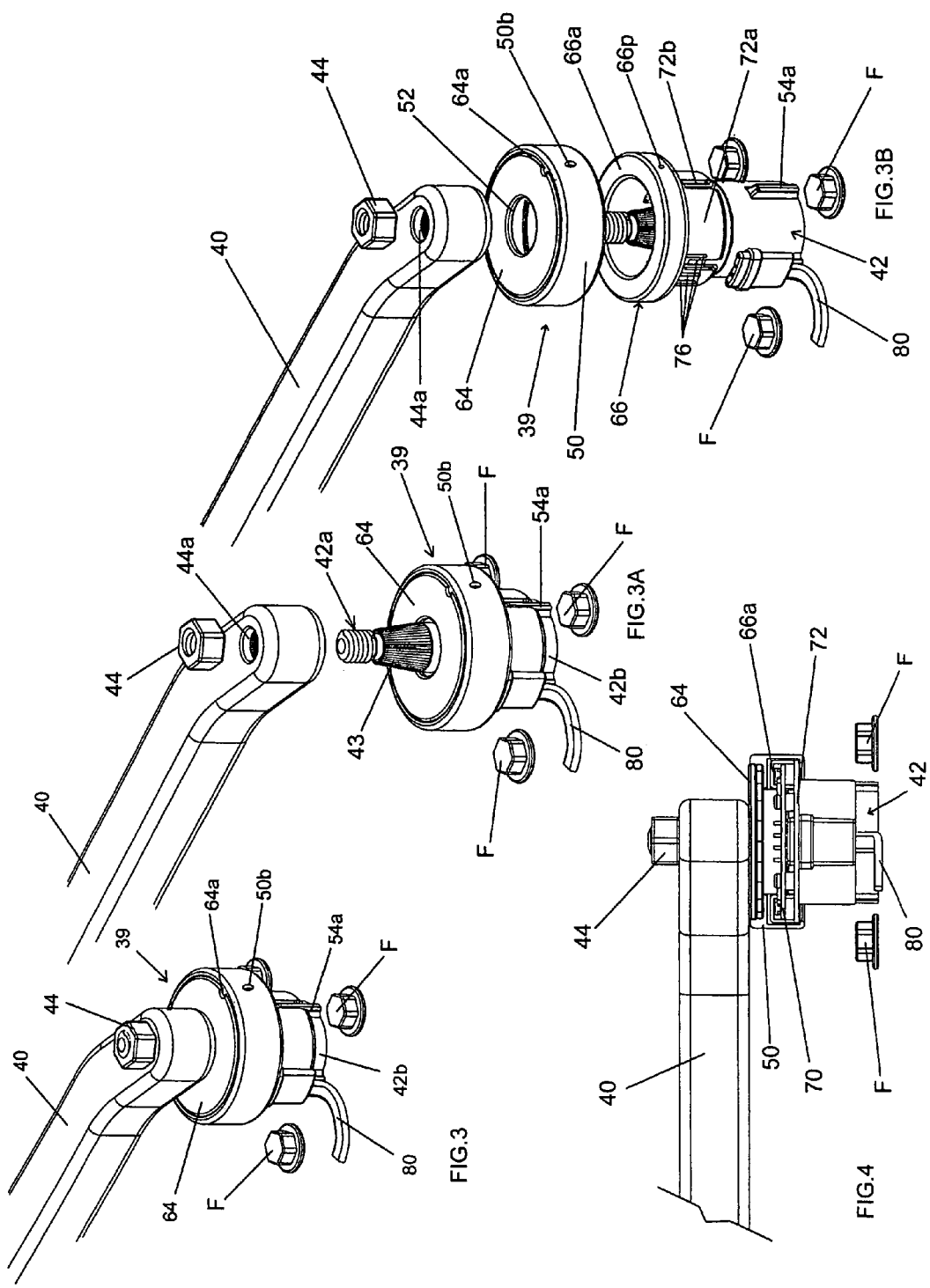

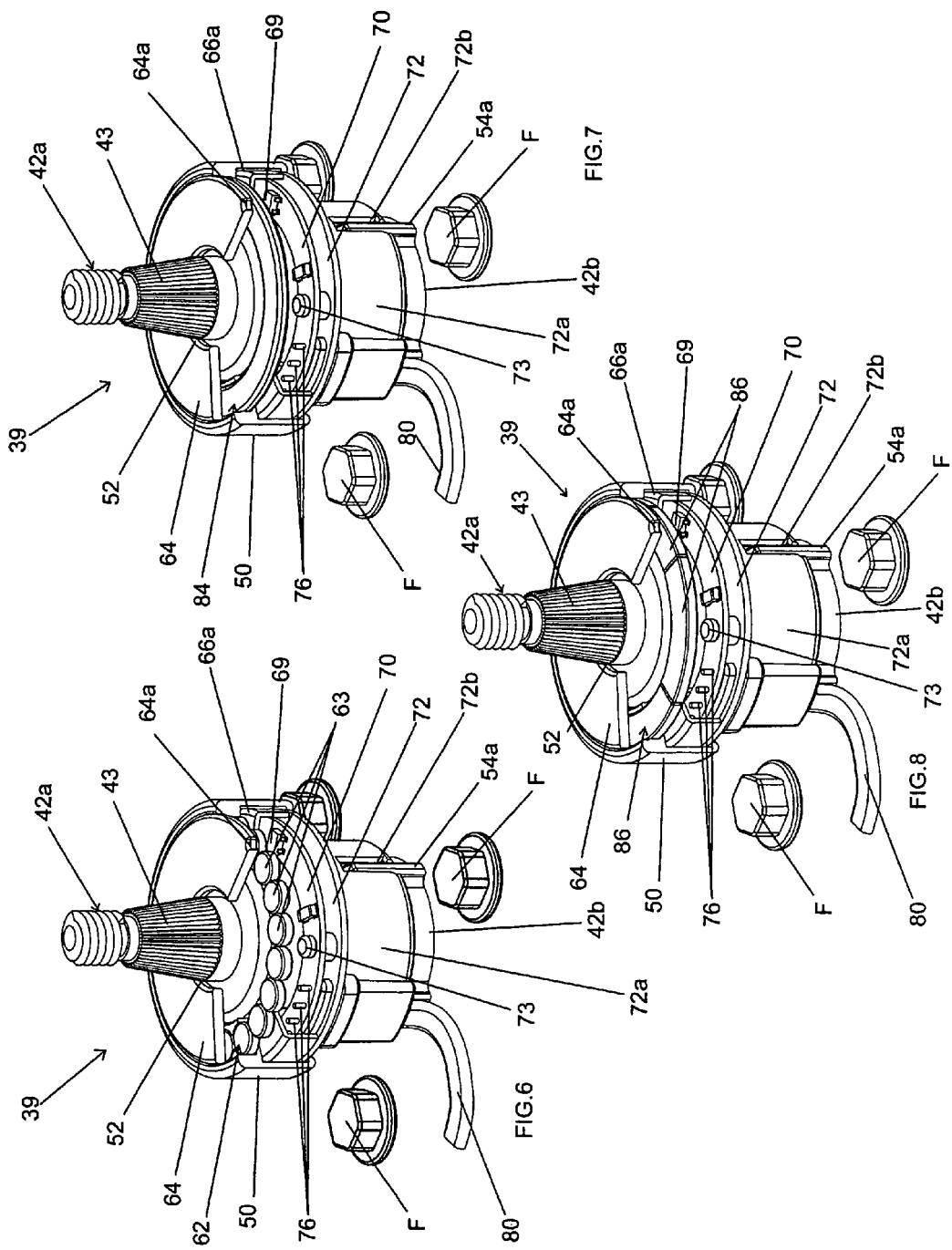

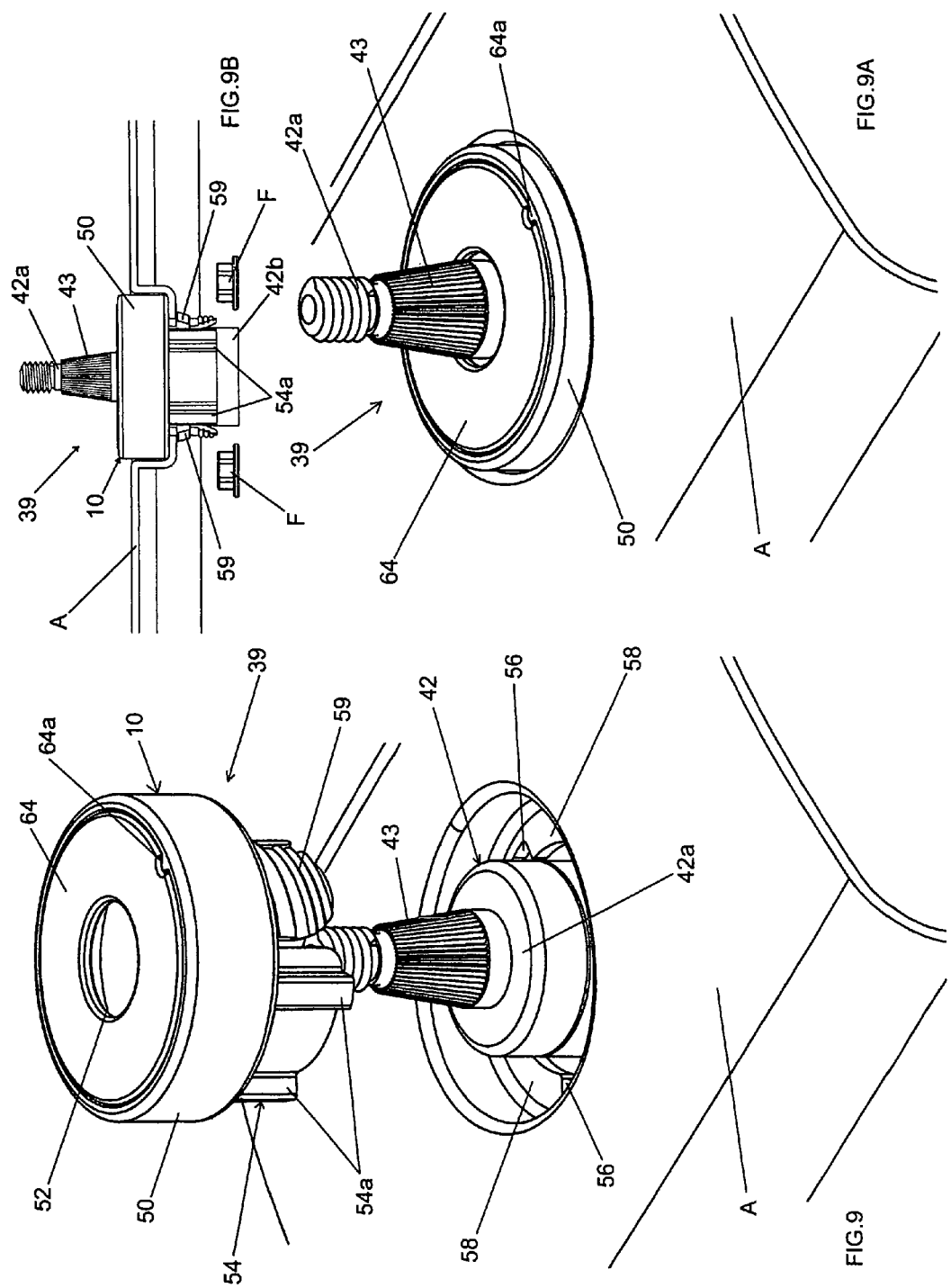

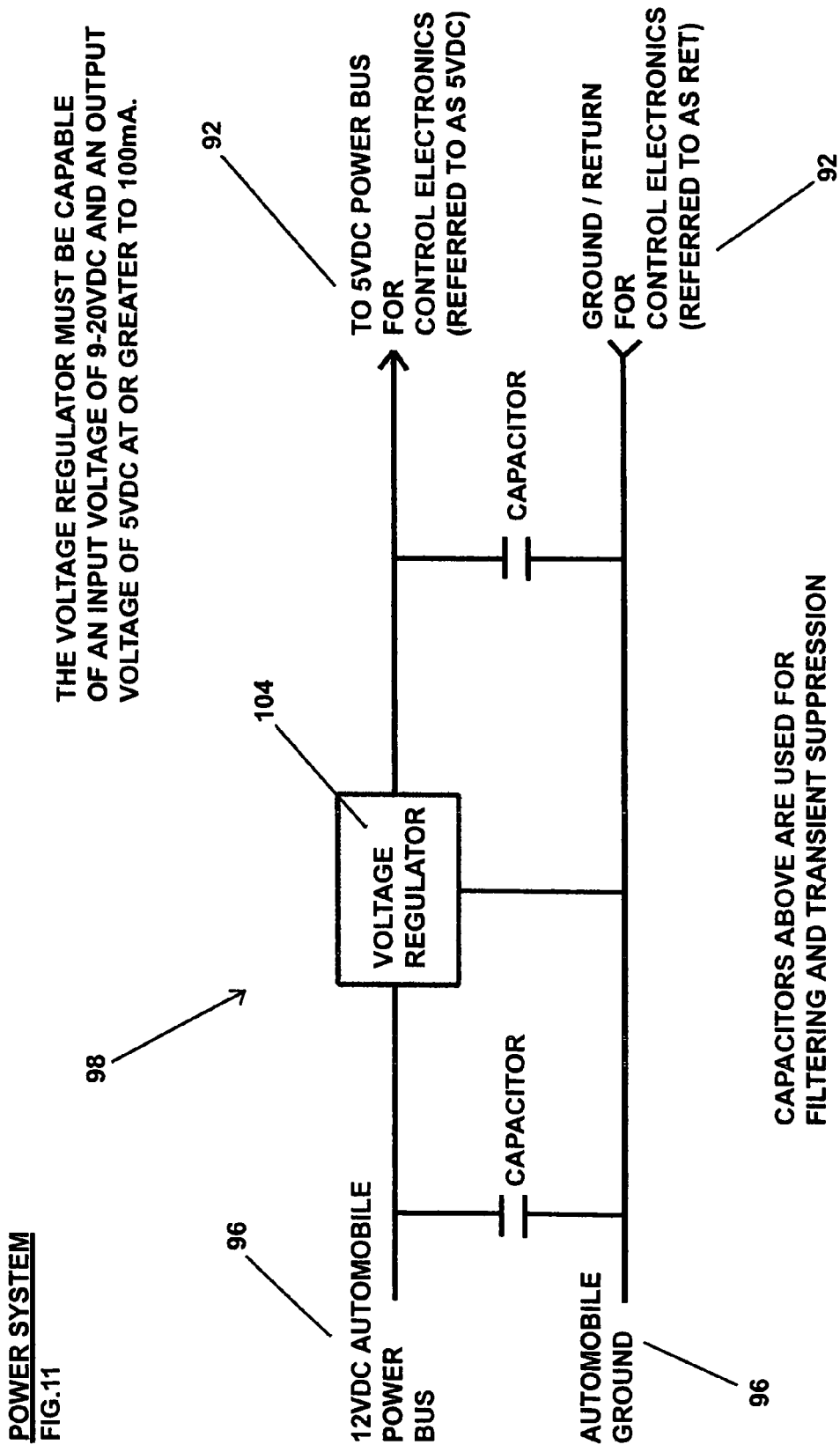

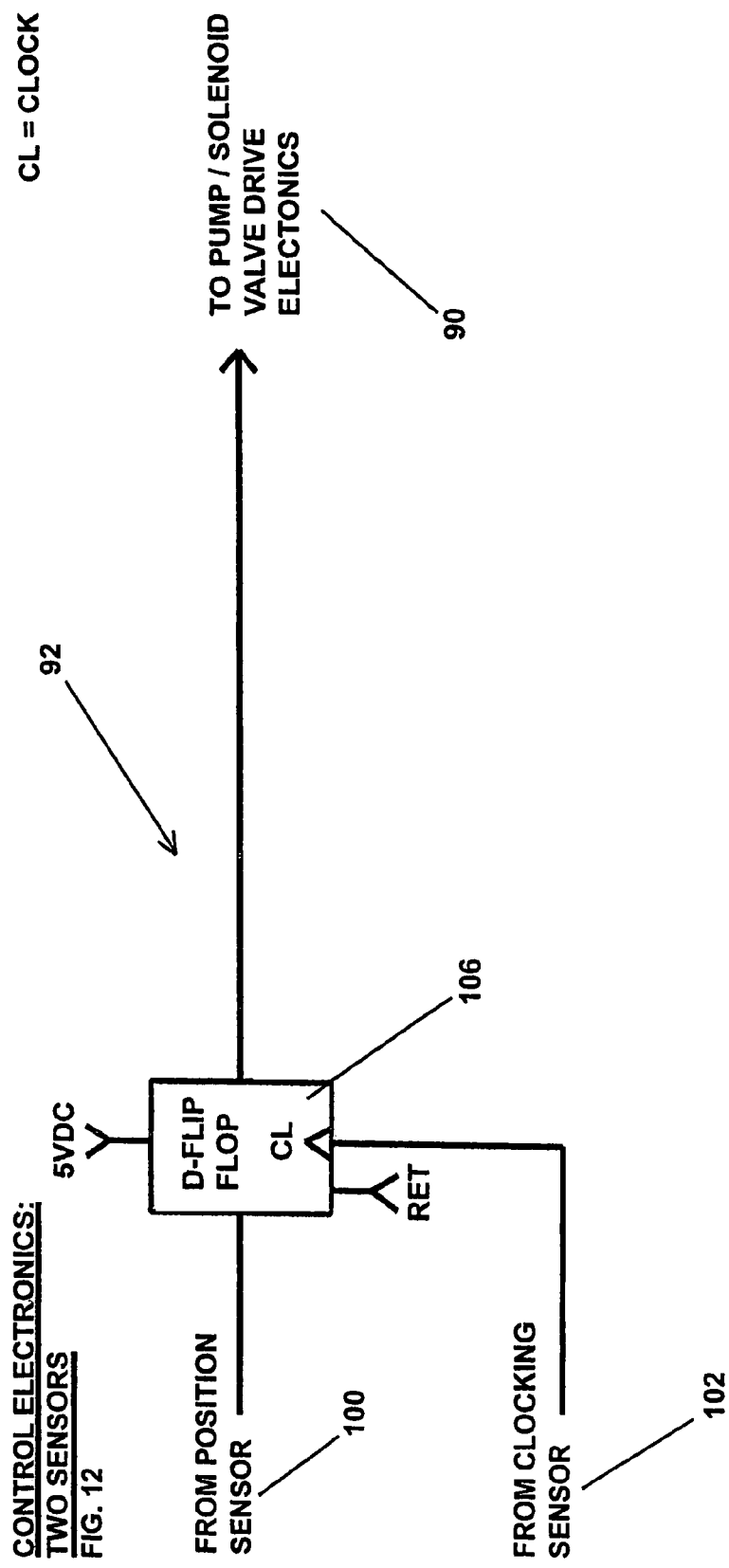

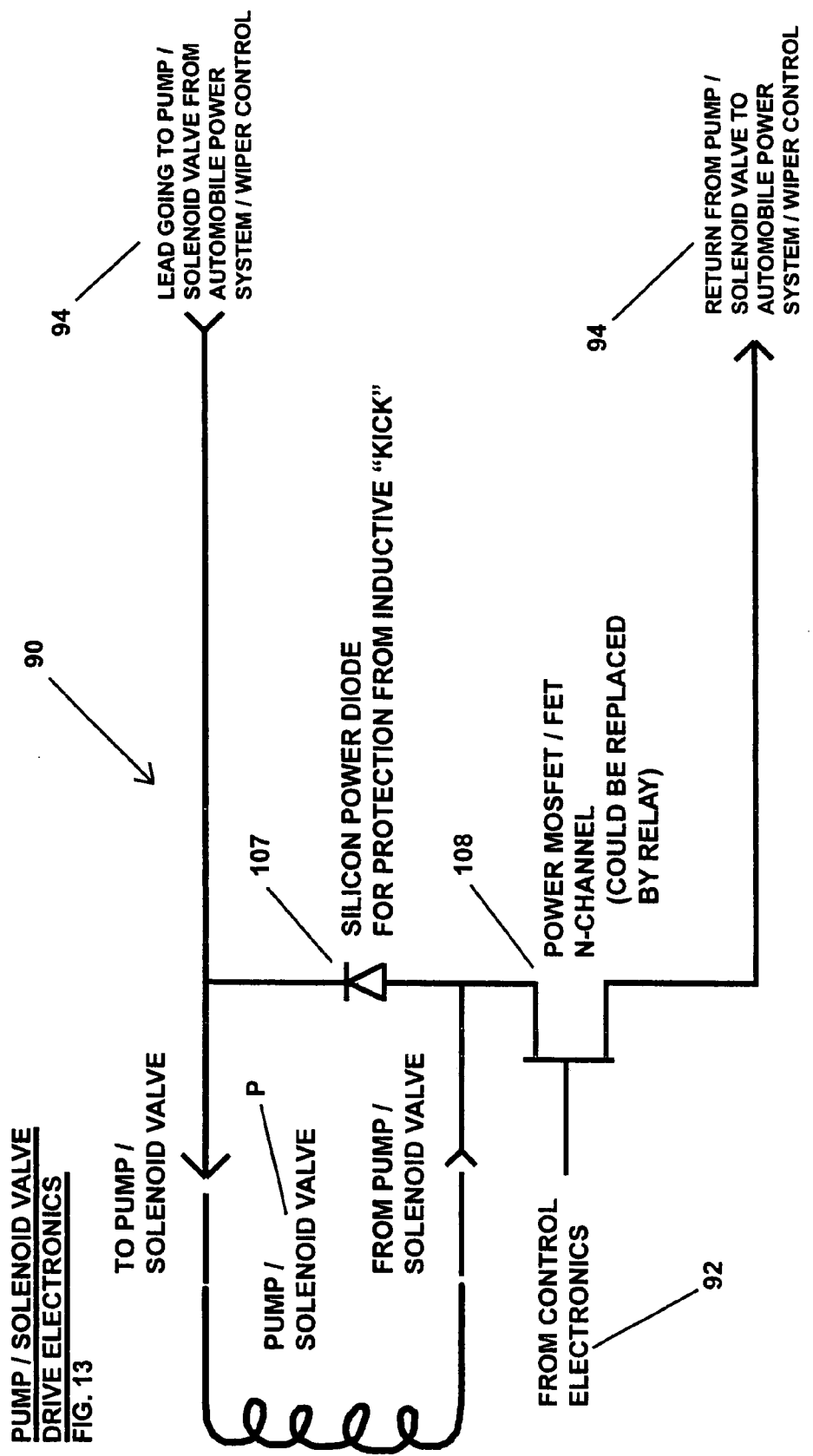

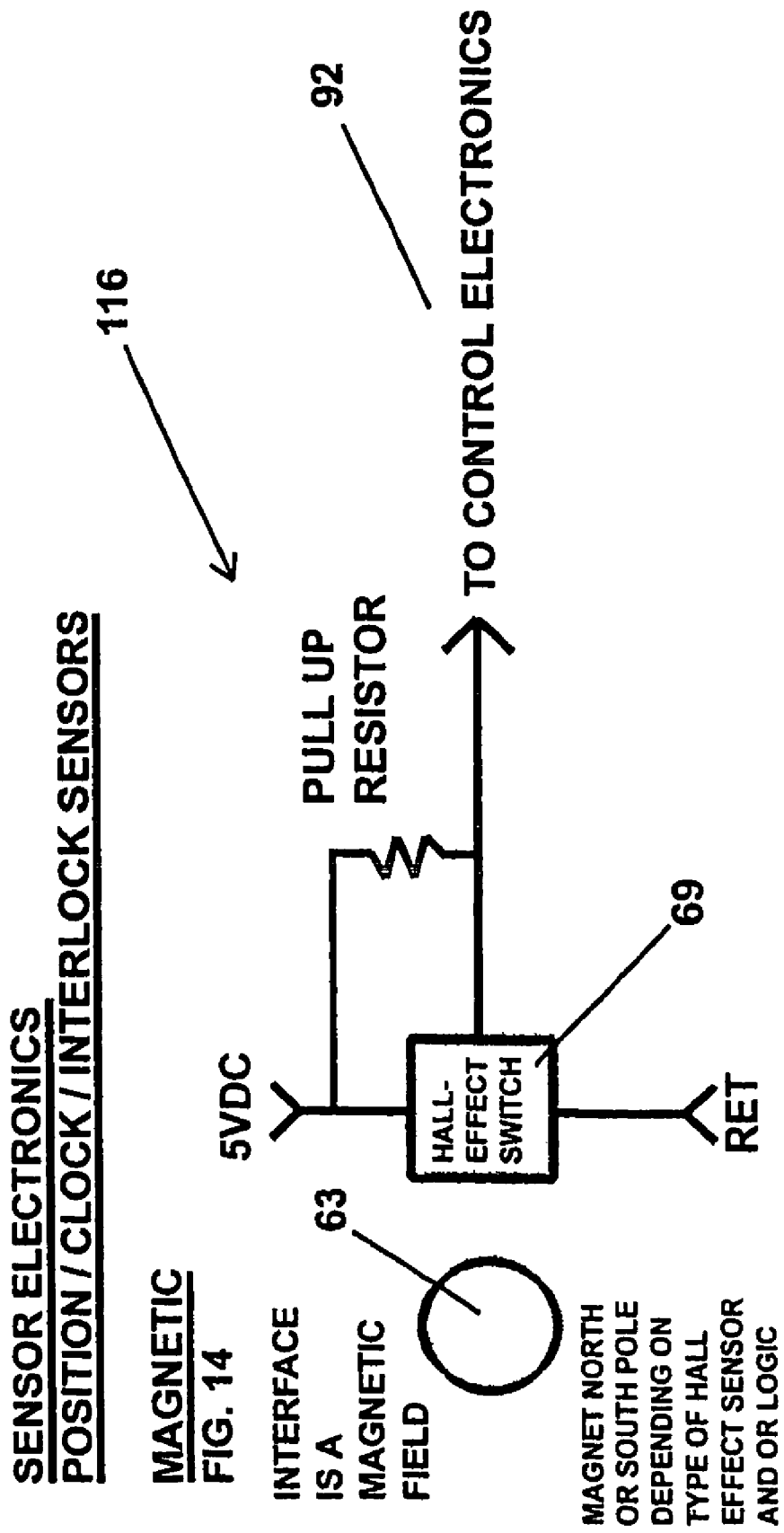

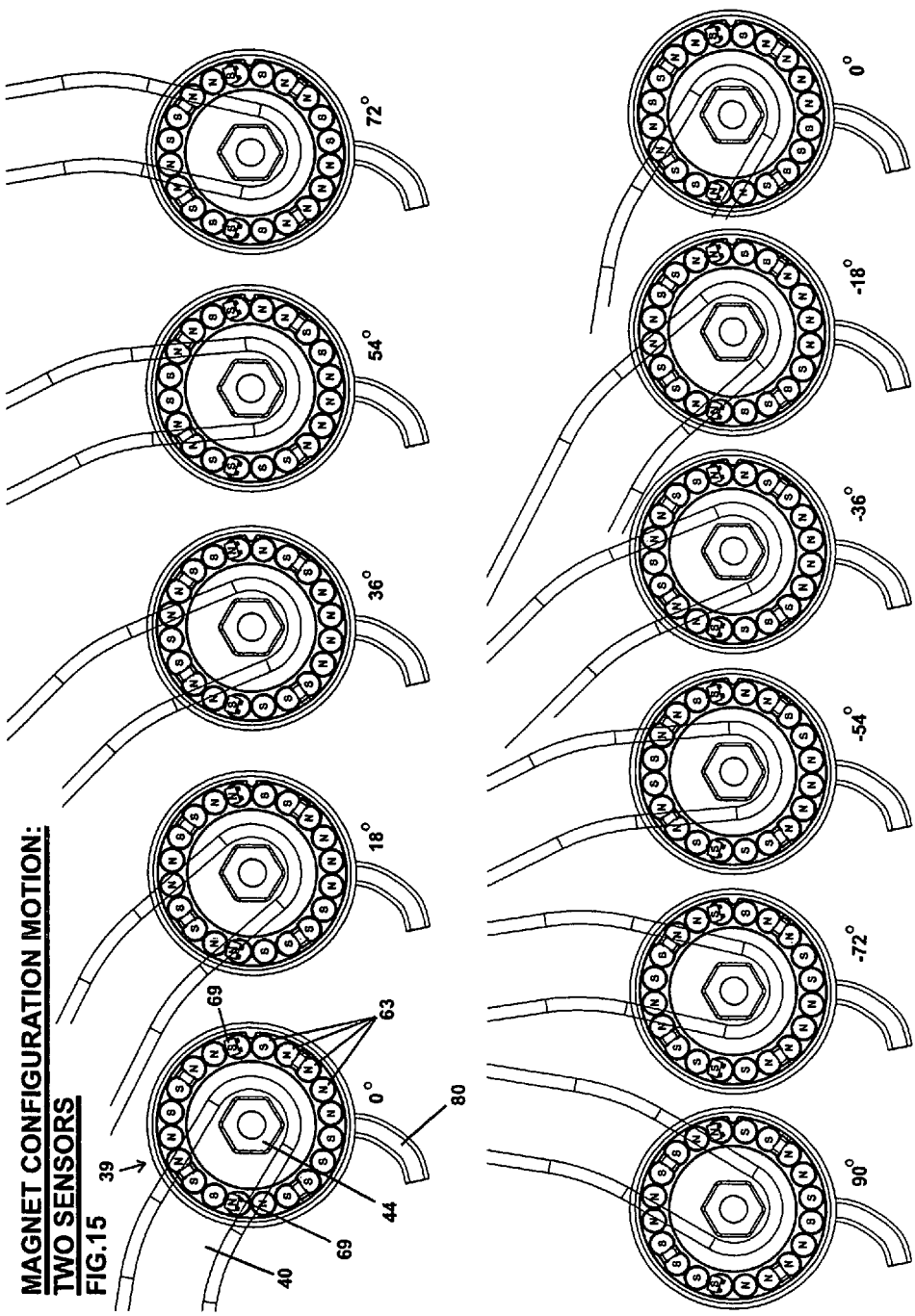

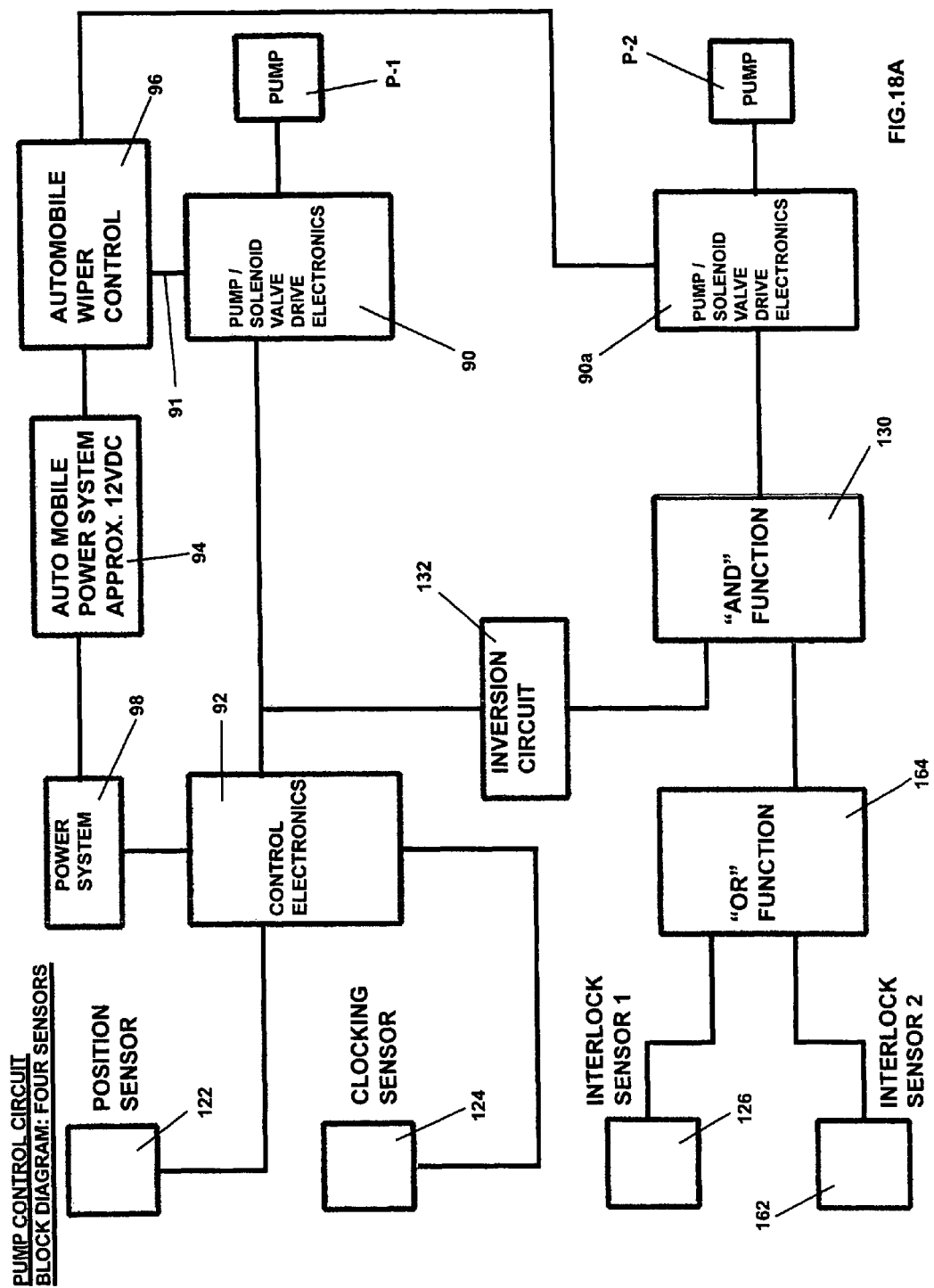

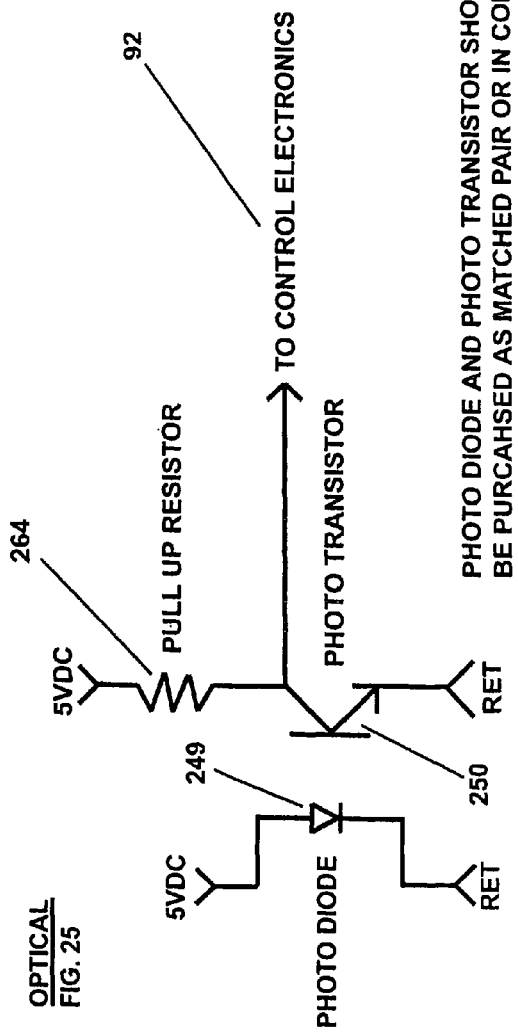

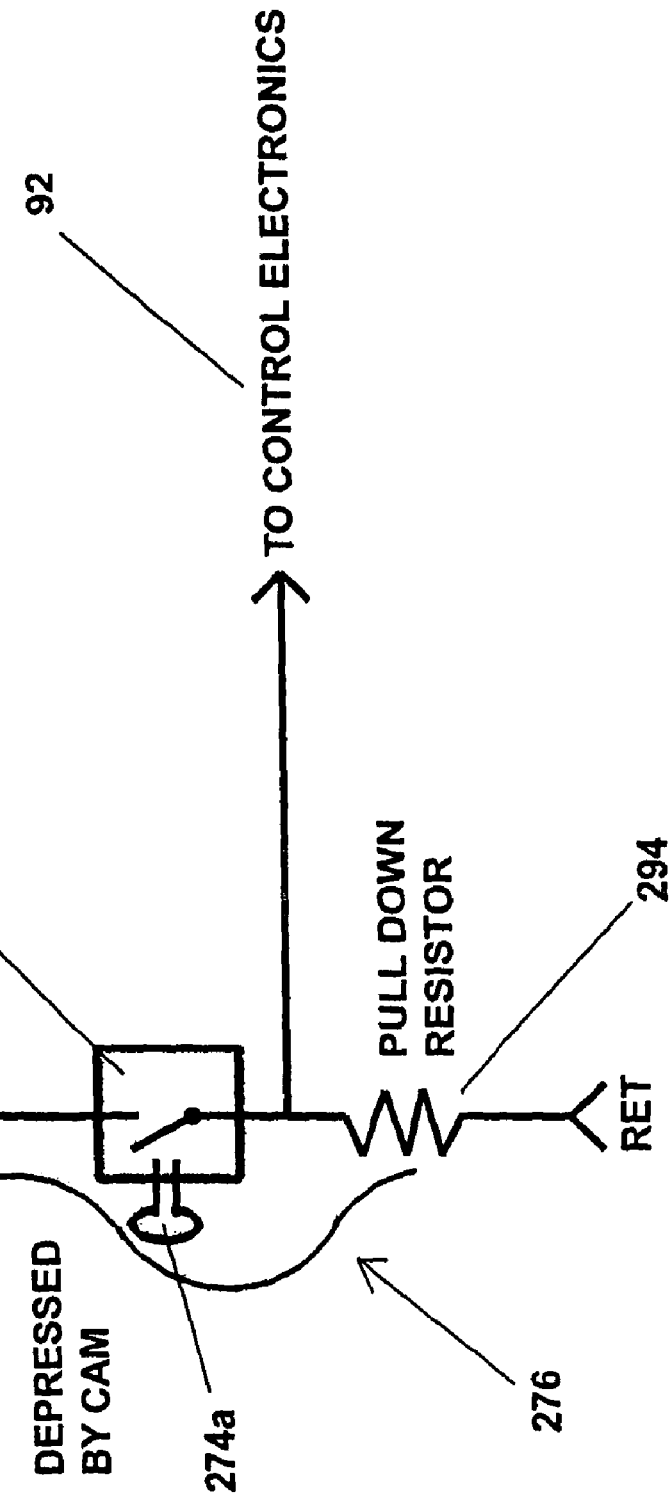

WIPER ASSEMBLY FOR SWEEPING A GLASS SURFACE ON A VEHICLE

BACKGROUND OF THE INVENTION

1. Field of the Invention

The present invention relates to a novel control system relating generally to wiper assemblies for sweeping a glass surface on a vehicle. More particularly, the invention concerns a wiper assembly which includes a feed conduit connected to a fluid pump and liquid reservoir of a vehicle with a novel control unit associated with the feed conduit for precisely controlling the flow of washing liquid to the glass surface of the vehicle.

2. Discussion of the Prior Art

Most modern motor vehicles provide a wiper assembly for wiping the windshield of the vehicle and some type of washing system for washing the windshield of the vehicle. As a general rule, a washing liquid reservoir is provided in the engine compartment of the vehicle along with a pump which pumps the washing liquid from the reservoir toward hood-mounted washer heads that deliver the washing liquid to the windshield at a location about the windshield wiper.

A common drawback of the vehicle systems which include two hood-mounted washer heads is that during the windshield washing process the cleaning fluid is delivered to the windshield either at a location above the wiper blade, which is typically partly through its upward cycle, or alternatively at a point below the wiper blade when the wiper blade is partly through its downward path. This arrangement results in the washing fluid being spread in a solid fan dispersment, temporarily impairing the driver's vision while also allowing the upward path of the wiper blade to smear the residue on the glass further impairing the view of the driver. Because of this drawback the vehicle operator is required to repeatedly supply washing fluid to the windshield in order to adequately clean the windshield and thus repeatedly impairing the vision of the driver.

A number of prior art patents disclose various types of windshield washer apparatus that can be removably attached to a conventional wiper blade. Exemplary of such an apparatus is that disclosed in U.S. Pat. No. 4,517,704 issued to Benson. This apparatus includes an elongated member defining a generally U-shaped cross section and including adjacent one side thereof a tubular portion extending the longitudinal extent of the elongated member, the tubular portion defining a plurality of apertures therein. The elongated member further includes adjacent an opposite side thereof, a U-shaped channel portion extending longitudinally of the elongated member. An elongated, hollow tubing removably retained by the U-shaped channel portion is interconnected at one end to an open end of the tubular portion and at the other end to a conduit from a cleaning solution source.

Another prior art windshield washer apparatus is disclosed in U.S. Pat. No. 4,516,288 issued to Benson. This apparatus includes apparatus that is disclosed in U.S. Pat. No. 4,517,704 issued to Fizyta. This apparatus includes a spray nozzle mounted on the wiper arm intermediate the ends of the wiper blade. The nozzle includes a first baffle surface disposed at an obtuse angle relative to a base surface and at an acute angle relative to a transverse frontal wall surface upstanding from the base surface. A fluid dispensing orifice extends through the transverse wall with its axis normal to the frontal wall surface. Secondary baffle surfaces are provided by means of a notched-out portion formed in the first baffle surface. The orifice directs a stream of fluid such that a primary spray of the fluid is dispersed to upper and intermediate bladed areas of the windshield and a secondary spray of fluid is dispersed normal to the lower bladed area of the windshield.

Still another prior art windshield washer apparatus is disclosed in U.S. Pat. No. 3,793,670 issued to Riester, et al. This apparatus includes an arm mounted spray nozzle. The nozzle includes a baffle projecting from a base member having a surface at a compound angle with respect to the member for dispersing the fluid into a conical-shaped configuration of droplets and directing the array of droplets toward the windshield in the path of the windshield wiper. Washer solvent under pressure is directed through an orifice toward the baffle. A nipple is provided at the orifice to which flexible tubing extending along the length of the arm is connected at one end. At the other end the tubing is connected to a washer pump so that washer fluid can be directed through the tubing and the orifice against the baffle.

As a general rule, the prior art vehicle windshield washing systems fail to effectively and efficiently clean the vehicle windshield without undesirable smearing and in use tend to be little better than the conventional hood-mounted washer heads typically found on most modern vehicles.

The thrust of the present invention is to overcome the drawbacks of the prior art vehicle windshield washing systems by providing a novel vehicle wiper assembly that includes not only a liquid feed conduit carried directly by the vehicle wiper system, but also uniquely includes a novel control unit that precisely regulates the flow of fluid onto the wind shield. More particularly, the control unit includes sensors that sense the position of the wiper blade and then controls the flow of washing onto the vehicle windshield based upon the position of the wiper blade. This design eliminates the dangerous driving condition of the fan water spray on the windshield obstructing the driver's view of the road. The washing liquid feed conduit extending from the combination washer tube and blade assembly is interconnected with the vehicle washing fluid reservoir via the control unit by an elongated flexible tube which can readily be connected to the washing liquid pump that is typically housed within the vehicle engine compartment.

With this novel arrangement, the wiper assembly of the present invention can be used to replace the wiper assembly supplied with the vehicle and can be interconnected with the washing liquid reservoir by simply removing the flexible tube used to connect the liquid pump with the hood-mounted spray head and replacing it with the flexible tube and combined washer tube and blade assembly unit that is interconnected with the liquid feed conduit of the vehicle. This replacement can be accomplished quickly and easily and without the necessity of making any major changes to the stock vehicle windshield washing system.

One embodiment of the invention comprises a single, pre-assembled unit containing a washer blade assembly with an extended washer tube permanently attached to, and made an integral part of, the washer blade assembly.

This unit can be placed on vehicles at the point of manufacture or retro-fitted to existing vehicles by simply detaching the existing washer blade assembly and replacing it with the combination washer tube and blade invention. Another method of accomplishing the same result as a washer tube and blade assembly is to extrude the wiper blade to include a hollow tube adapted to carry and expel the washing fluid to the surface of the windshield in the same manner as the washer tube and blade assembly unit.

SUMMARY OF THE INVENTION

It is an object of the present invention to provide a combination wiper assembly and associated fluid flow control unit for sweeping a glass surface on a vehicle. More particularly, it is an object of the invention to provide a wiper assembly which includes a washer liquid feed conduit that is connected to the fluid reservoir of the vehicle for supplying a washing liquid directly upon the glass surface of the vehicle and an associated control unit that is disposed between the wiper assembly and the fluid reservoir that precisely controls the flow of washing liquid based upon the position of the wiper blade.

Another object of the invention is to provide a combination of the aforementioned character in which the control unit comprises magnetic, optical or mechanical sensors for sensing the position of the wiper blade and controlling the flow of washer fluid onto the windshield.

Another object of the invention is to provide a wiper assembly of the character described in the preceding paragraphs in which the washer liquid feed conduit and blade assembly can be interconnected with the supporting structure of the windshield wiper assembly without the need for special tools and without the need for any substantial modification to the conventional wiper assembly.

Another object of the invention is to provide a wiper assembly of the class described in which the washer liquid feed conduit includes a novel spray head that is positioned to spray the washer liquid uniformly directly down onto the surface to be cleaned immediately in advance of the wiper blade of the windshield wiper assembly so that the wiper blade can efficiently and effectively clean the surface.

Another object of the invention is to provide a wiper assembly of the character described in the preceding paragraph in which the washer liquid feed conduit is provided with a plurality of longitudinally spaced outlets that are strategically arranged to uniformly deposit the washer liquid onto the surface to be cleaned.

Another object of the invention is to provide a wiper assembly of the character described in the preceding paragraphs in which the spray head of the liquid feed conduit comprises a generally dome-shaped spray head having a generally arcuate-shaped spray outlet which sprays a predetermined pattern of washer liquid directly down onto the surface to be cleaned.

Another object of the invention is to provide a wiper assembly of the character described in which the spray head comprises a slitted-nozzle that uniformly sprays the washer liquid directly down onto the surface to be cleaned in advance of the travel of the wiper blade of the wiper assembly.

Another object of the invention is to provide a liquid washer feed conduit assembly that is of a simple construction and one that can be easily interconnected with a conventional, commercially available wiper assembly.

Another object of the invention is to provide a washer blade with a hollow tube, with one inch interval holes, manufactured as part of the blade to uniformly spray the washer fluid directly down onto the vehicle windshield to be cleaned in advance of the travel of the wiper portion of the wiper blade.

Another object of the invention is to provide an apparatus of the character described in the preceding paragraphs which is reliable in operation and one which can be inexpensively manufactured in quantity.

BRIEF DESCRIPTION OF THE DRAWINGS

FIG. 1 is a generally perspective, partially diagrammatic, top view of one form of the apparatus of the present invention for sweeping a glass surface on a vehicle.

FIG. 1A is a top plan view of the wiper blade apparatus illustrated in FIG. 1.

FIG. 2 is a generally perspective, bottom view of one form of the wiper assembly of the apparatus of the invention.

FIG. 2A is a greatly enlarged, fragmentary view of the area designated in FIG. 2 as "2A".

FIG. 2B is a greatly enlarged, fragmentary view of the area designated in FIG. 2 as "2B".

FIG. 3 is an enlarged, fragmentary, generally perspective view, similar to FIG. 1A, showing a portion of the windshield wiper assembly shown interconnected with one form of the sensor electronics of the invention.

FIG. 3A is an enlarged, generally perspective, exploded view of the portion of the apparatus of the invention illustrated in FIG. 3.

FIG. 3B is a different enlarged, generally perspective, exploded view of the portion of the apparatus of the invention illustrated in FIG. 3.

FIG. 4 is an enlarged, fragmentary, side-elevational view of a portion of the windshield wiper assembly shown in FIG. 3 interconnected with one form of the sensor electronics of the invention.

FIG. 6 is an enlarged, generally perspective view showing one form of the control unit of the invention mated with the windshield wiper drive motor linkage and partly broken-away to show internal construction of the circumferentially spaced-apart disk magnet components of the sensor electronics.

FIG. 7 is an enlarged, generally perspective view, similar to FIG. 6, showing the control unit of the invention mated with the windshield wiper drive motor linkage and partly broken-away to show the ring magnet component in position, instead of the circumferentially spaced-apart disk magnet components of the sensor electronics.

FIG. 8 is an enlarged, generally perspective view, similar to FIG. 7, showing an alternate form of the control unit of the invention mated with the windshield wiper drive motor linkage and partly broken-away to show the segmented strip magnet component in position, instead of the ring magnet component of the sensor electronics.

FIG. 9 is a generally perspective, exploded view of one form of the control unit of the invention in position to be mated with the windshield wiper drive motor linkage which is shown installed within the mounting recess formed within the automobile hood.

FIG. 9A is a generally perspective view similar to FIG. 9, but showing the control unit of the invention mated with the windshield wiper drive motor linkage.

FIG. 9B is a generally diagrammatical, side-elevational view showing the control unit of the invention mounted within the cowling of the vehicle.

FIG. 11 is a generally schematic view of one form of the power system of the pump control circuit shown in FIGS. 10 and 10A.

FIG. 12 is a generally schematic view of one form of the control electronics of the pump control circuit shown in FIGS. 10 and 10A.

FIG. 13 is a generally schematic view of one form of the pump/solenoid valve drive electronics of the control circuit shown in FIGS. 10 and 10A.

FIG. 14 is a generally schematic view of one form of the position sensor/clocking sensor of the control circuit shown in FIG. 10A.

FIG. 15 is a generally diagrammatic view illustrating the operation of one form of the magnetic-type sensor of the invention.

FIG. 18A is a generally schematic view of another form of the pump control circuit of the control unit of the invention.

FIG. 25 is a generally schematic view of one form of the optical sensor electronics of the apparatus shown in FIGS. 24 and 24A.

FIG. 27 is a generally schematic view of one form of the mechanical sensor electronics of the apparatus shown in FIGS. 26 and 26A.

DESCRIPTION OF THE INVENTION

Figure 5:
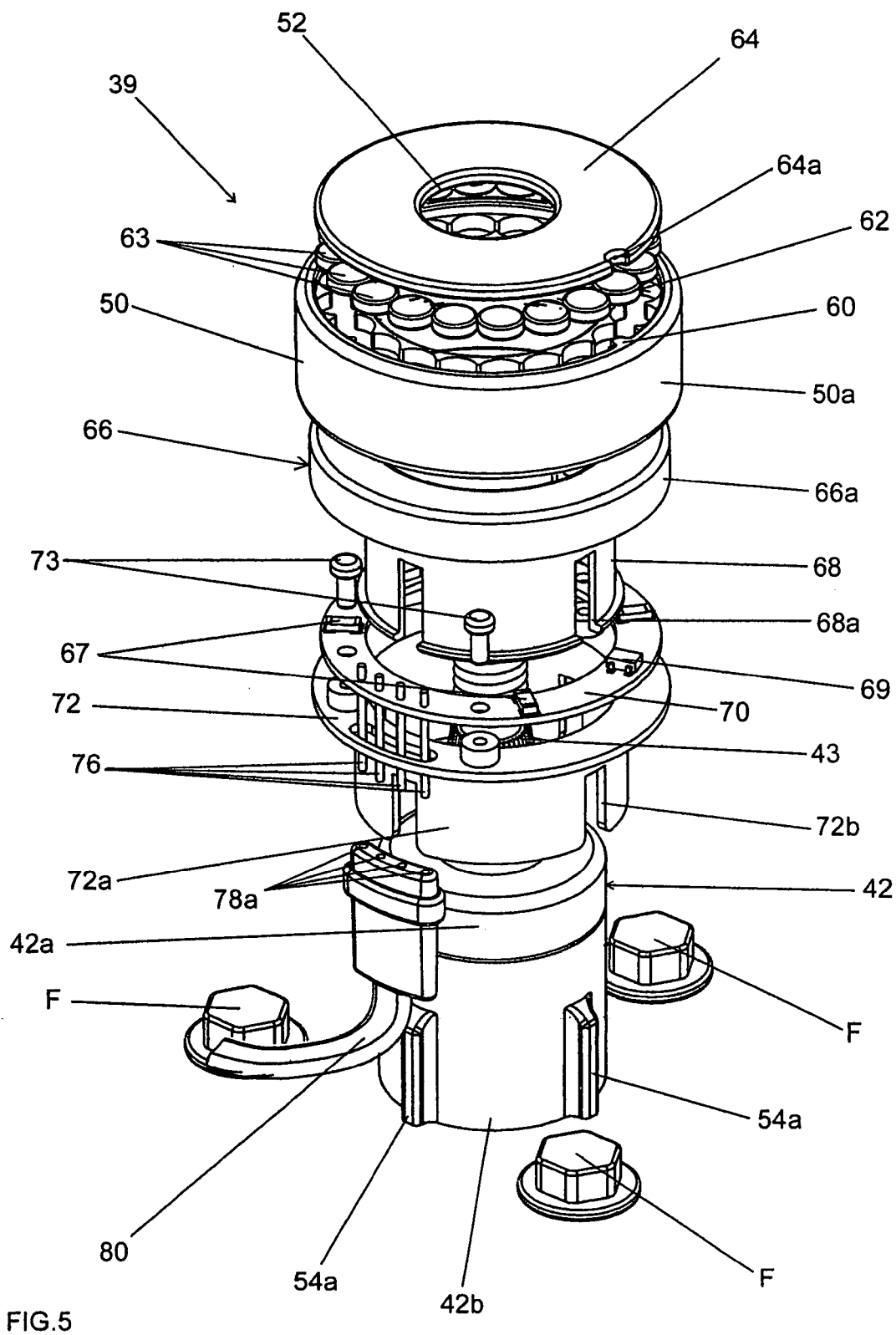
FIG. 5 is an enlarged, generally perspective, exploded view showing one form of the sensor electronics of the invention mated with the windshield wiper drive motor linkage.

Referring to the drawings and particularly to FIGS. 1 through 6, one form of the apparatus of the present invention for sweeping a glass surface on a vehicle is there shown and generally designated by the numeral 14. This form of the apparatus comprises two major cooperatively associated components, namely windshield washer means for dispensing a washing liquid onto the vehicle windshield and control means for controlling the dispensing of the washing liquid from the windshield washer means. In the present form of the invention the windshield washer means comprises a wiper assembly 16 and the control means, the character of which will presently be described.

The wiper assembly 16 comprises a structural support 18 having first and second extremities 20 and 22. Interconnected with extremities 20 and 22 is a conventional wiper blade 24. Structural support 18 includes transversely spaced-apart side walls 18a and 18b which are used to pivotally interconnect the wiper assembly with the vehicle drive arm that drives the wiper assembly relative to the automobile windshield.

Forming an important aspect of the wiper assembly is a feed conduit assembly 26 that is connected to structural support 16 by means of a pair of connector brackets 30 (see FIG. 1). In the present form of the invention the feed conduit assembly 26 comprises, in addition to brackets 30, an elongated, semi-rigid tubular feed conduit 32 having a fluid inlet 34 and a plurality of longitudinally spaced-apart fluid outlets 36 for directing the washer fluid toward the glass surface of the vehicle that is to be cleaned (see FIG. 2). Feed conduit 32 has a crimped end 32a of the character best seen in FIG. 2. Feed conduit assembly 26 further comprises a flexible supply conduit 38 having an inlet 38a which is connected to the pump "P" of the automobile wiper assembly and an outlet which is connected to the fluid inlet 34 of feed conduit 32 via a conventional check valve "V" that prevents fluid flow in a reverse direction. As indicated in FIG. 1 of the drawings, pump "P" is interconnected with the vehicle source of windshield washing fluid "R" by means of the conduit "C".

In a manner presently to be described, activation of the pump "P" by the control means of the invention will cause the washer fluid to controllably flow into the feed conduit 32 via a conventional check valve "V" and outwardly of the apertures 36 in a controlled fashion. Because of the strategic location of the apertures 36, the washer fluid will flow uniformly onto the surface to be cleaned in advance of the travel of the wiper blade 24 in a manner such that the wiper blade can efficiently clean the surface to be cleaned.

Turning now to FIGS. 3, 3A, 3B, 4, 5, and 6, one form of the control means of the invention for controlling the dispensing of washer fluid onto the vehicle windshield is there shown. In the present form of the invention, this important control means comprises a control unit 39 that is interconnected with the vehicle drive arm 40, to which the wiper assembly 16 is interconnected by means of brackets 18a and 18b of FIG. 1A. Drive arm 40 is of conventional construction and is interconnected with the wiper arm drive means of the control unit 39 in the manner best seen in FIGS. 3, 3A and 3B. More particularly, the drive means, which functions to controllably move the wiper drive arm 40 upwardly and downwardly relative to the surface to be washed, here includes the drive motor linkage 42. Drive motor linkage 42 has a drive hub 42b, which secures the motor linkage to the automobile in a conventional manner by means of bolts "F" and a drive shaft 42a that is provided with a splined, tapered portion 43 that drivably mates with a grooved, driven portion formed in the wiper drive arm (FIG. 3A).

Control unit 39 includes a housing 50 within which the important sensing means of the invention are housed. This sensing means, the details of which will be discussed in the paragraphs that follow, functions to sense the position of the wiper arm as it moves upwardly and downwardly relative to the glass surface of the vehicle being washed and to energize the pump at selected positions of the wiper drive arm. Referring particularly to FIGS. 5, 6, 7, and 8, it is to be observed that the sensing means of the present form of the invention, which is housed within a chamber 60 that is provided in the upper portion 50*a* of housing 50, is here provided in the form of a two-position magnetic sensor 62 that includes a plurality of circumferentially spaced disk magnets 63 (see FIGS. 5 and 6).

Disposed within housing 50 is a sensor housing 66 that is comprised of an electronics housing 66*a* and an electronics base 72. Potted within these two components and secured with conventional fasteners 73, is a sensor board 70. Sensor board 70 carries a pair of circumferentially spaced, readily commercially available Hall Effect sensors 69, which can be purchased from Allegro Microsystems, Inc, of Worcester Mass. Electronics housing 66*a* includes a depending skirt 68 that is telescopically received within electronics base 72. Skirt 68 is aligned with a depending base skirt 72*a* by means of a plurality of circumferentially spaced slots 68*a* formed in housing 68 and a plurality of slots 72*b* formed in skirt 72*a*. Slots 68*a* and 72*b* are arranged to receive circumferentially spaced locking ribs 54*a* formed on drive hub 42*b* so as to ensure that sensor board 70 remains stationary.

Housing 50 is closed by an upper steel shield 64 that is provided with an aperture 52 for closely receiving the splined, tapered portion 43 of drive motor linkage 42. Steel shield 64, which functions to block and direct the magnetic fields of the disc magnets 63, is secured between the wiper arm 40 and drive shaft 42*a* and is indexedly aligned with the wall of housing 50 by means of a detent 64*a* (FIG. 3). Housing 50 telescopically receives sensor electronics 66, orienting its magnetic configuration with the Hall Effect Sensors 69, by means of an alignment orifice 50*o* formed in housing 50 (FIG. 3B) and a calibration protuberance 66*p* provided on the electronics housing 66*a* (FIG. 3B). Drive arm 40 is held in position on the drive shaft 42*a* in a conventional manner by means of a nut 44. With this construction, housing 50 is free to travel with the rotating motion of drive shaft 42*a* and wiper arm 40, while sensor housing 66 is interlocked with the mounted drive hub 42*b* by means of locking ribs 54*a*. It is to be understood that drive motor linkage 42 can either be a specially fabricated unit that forms a part of the control unit of the invention, or, in the alternative, can comprise a standard automobile wiper arm drive unit.

As seen in FIGS. 5 and 6, a plurality of sensor board pin connectors 76 extend through the openings provided in the sensor board 70 and the electronics base 72. Pin connectors 76 are adapted to be telescopically received within pin receiving openings 78*a* provided in a sensor board connector 78. Sensor board connector 78 is adapted to be operably interconnected with the control electronics of the control unit 39 in a conventional manner by means of an elongated connector cable 80. This allows the sensor electronics to relay the position of the wiper arm 40 to the control electronics associated with the control unit 39.

Turning now to FIG. 7, an alternate form of the invention is there shown. This form of the invention is similar in most respects to the embodiment shown in FIGS. 1 through 6 and like numerals are used in FIG. 7 to identify like components. The primary difference between this latest form of the invention and that previously described resides in the provision of a ring magnet 84 that takes the place of the plurality of disk magnets 63 shown in FIG. 6.

Turning to FIG. 8 of the drawings, still another slightly different form of the invention is there shown. This form of the invention is also similar in most respects to the embodiment shown in FIGS. 1 through 6 and like numerals are used in FIG. 7 to identify like components. The primary difference between this latest form of the invention and that shown in FIGS. 6 and 7 resides in the provision of a plurality of strip or segment magnets 86 that take the place of the disk magnets 63 shown in FIG. 6 and the ring magnet 84 of FIG. 7.

As well understood by those skilled in the art, the ring magnet 84 and the strip or segment magnets 86 operate in basically the same manner to accomplish the same result as do the disk magnets 63.

It is to be noted that, rather than being magnetic, the sensing means of the invention can alternatively comprise optical (FIG. 24) or mechanical (FIG. 26) sensors for sensing the position of the wiper blade and appropriately activating and deactivating the pump "P" in a manner that will be discussed in paragraphs that follow.

Turning to FIGS. 9, 9A and 9B, the sensor electronics of the invention are shown mounted in a conventional manner within the cowling "A" of a vehicle, such as an automobile (FIG. 9B). As indicated in FIG. 9, the previously identified locking ribs 54*a* provided on a "snap fit" sensor housing 54, are received within circumferentially spaced slots 56 formed in a connector recess 58 provided in the cowling "A". "Snap fit" sensor housing 54 also includes a snap lock tab 59 (FIG. 9B) that is adapted to snappingly engage connector recess 58 so as to hold the housing in position within the vehicle cowling in the manner best seen in FIG. 9A.

Figure 10:
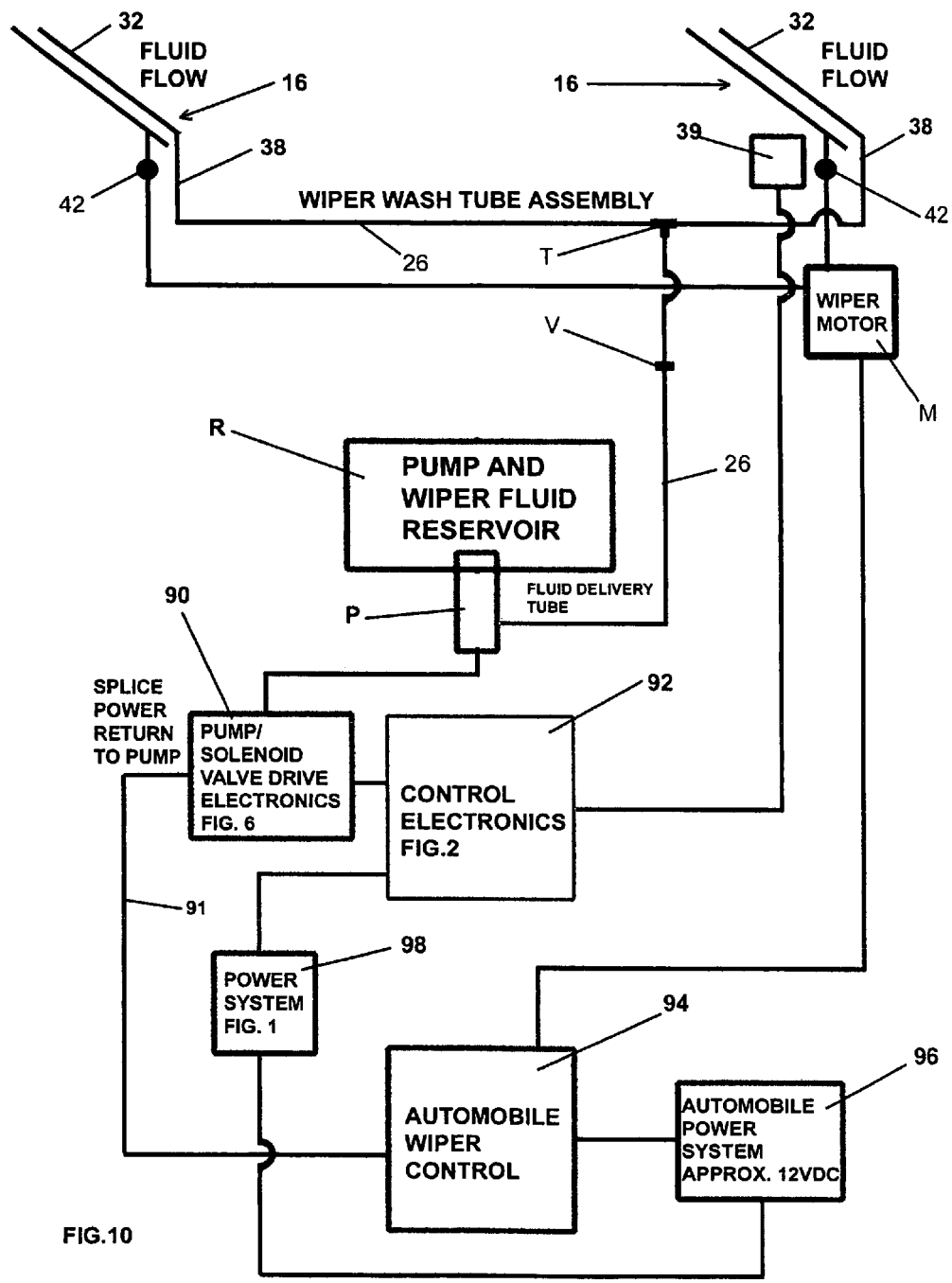
FIG. 10 is a generally schematic view of one form of the apparatus of the invention shown interconnected with various components of the automobile windshield wiper control system.

Referring next to FIG. 10 of the drawings, the interrelationship among the various components of the control unit of the present invention and the various components of the vehicle with which the control unit cooperates, is there schematically shown. In FIG. 10, the windshield wiper assemblies are generally designated by the numeral 16 and are shown interconnected with the vehicle wiper motor "M" by means of the motor linkage 42. Similarly, the conduit 26 is shown interconnected with the vehicle pump "P" and the vehicle fluid reservoir via the fluid delivery conduit, or tube 38. The pump "P" is, in turn, interconnected with the pump/solenoid valve drive electronics 90, which are, in turn, connected with the control electronics of the apparatus of the invention, which is generally designated by the numeral 92. Control electronics 92 receive position information of the wiper arm assembly 16 from the sensor electronics of the apparatus.

In FIG. 10, the pump/solenoid valve drive electronics 90 is shown interconnected with the automobile wiper control 94, which, in turn, is interconnected with the automobile power system 96. Power system 96 is interconnected with a power system 98, which, in turn, is interconnected with the control electronics 92 and provides power thereto. The details of construction and operation of these various components will be discussed in the paragraphs which follow.

Figure 10A:
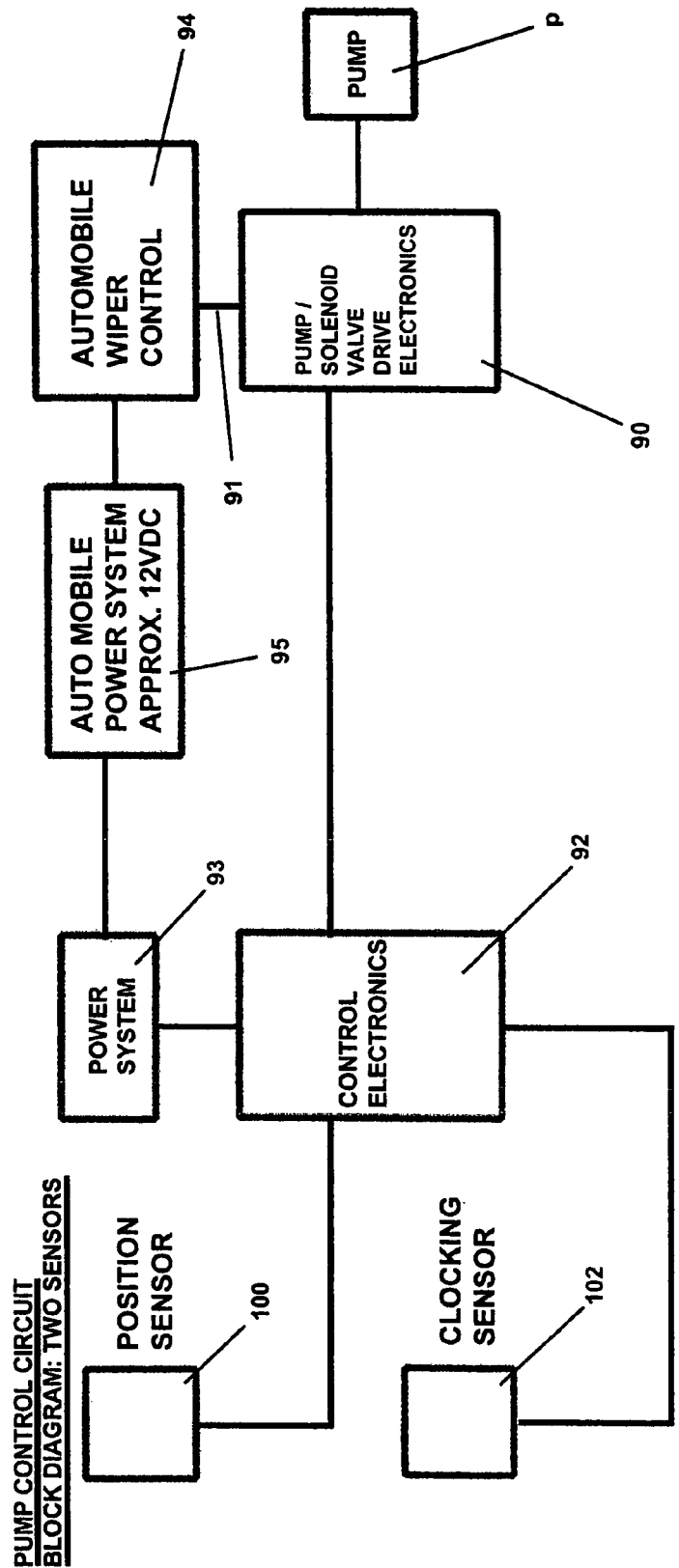
FIG. 10A is a generally schematic view of one form of the pump control circuit of the control unit of the invention.

FIG. 10A of the drawings, which is a block diagram somewhat similar to FIG. 10, illustrates one form of the pump control circuit of the invention which embodies two sensors, and controls a single device, in this case pump "P". Like numerals are used in FIG. 10A to identify like components shown in FIG. 10. As indicated in FIG. 10A, the two sensors of the control unit, namely a position sensor 100 and a clocking sensor 102, are operably interconnected with the control electronics 92.

In the present form of the invention, the pump/solenoid valve drive electronics 90 are in series with the automobile wiper wash controls via electronic conduit 91 and simply interrupt the single pump operation to coincide with the information supplied by the control electronics 92.

Referring to FIG. 11 of the drawings, the power system 98 can be seen to comprise a voltage regulator 104 that is interconnected with the automobile power bus and with a pair of conventional capacitors in the manner shown in FIG. 11. Voltage regulator 104 must be capable of an input voltage of 9-20 volts DC (VDC) and an output voltage of 5 VDC at or greater than 100 milliamps (ma).

As indicated in FIG. 11, the automobile power system supplies approximately 12 VDC to the power system and the power system becomes active as soon as the ignition switch of the automobile is turned on so that 5 VDC becomes available at the output and is fed to the control electronics in the manner shown in FIG. 11.

The control electronics illustrated in FIG. 12 embodies a conventional D-flip flop 106 to transfer the information from the position sensor 100 and from the clocking sensor 102 (see FIG. 10B) to the pump/solenoid valve drive electronics 90, the construction and operation of which is illustrated in FIG. 13 of the drawings.

In order to permit fluid flow to the wiper apparatus, the pump "P" must be energized by the control means of the invention and, more particularly, the pump/solenoid valve drive electronics 90, which form a part of the control means of the invention. This is accomplished by activating the power MOSFET/FET 108 (FIG. 13) so as to complete the circuit and permit the pump/solenoid valve drive electronics 90 to close the circuit to the pump and allow the pump to operate. Power diode 107 (rectifier type) that is placed across the pump in the manner indicated is used to protect the MOSFET/FET 108 from the inductive "kick" associated with inductive load of the pump once it is de-energized (i.e. upon shutoff).

Voltage regulator 104, D-flip flop 106 and MOSFET/FET 108 can be obtained from various sources including the Digi-Key Corporation of Thief River Falls, Minn.

When the pump "P" is activated it supplies wiper fluid forwardly of the wiper blade in its upward motion. This allows the excess fluid, if any, to be wiped away by the travel of the blade thereby, keeping the vision of the driver unimpaired at all times.

Turning next to FIG. 14, the operation of one form of the magnetic-type sensor of the present invention is there schematically shown. As previously mentioned, the control electronics here comprises two sensors, namely a position sensor 100 and a clocking sensor 102. The sensors employed are Hall Effect sensors 116, which are readily commercially available from various sources, including Allegro Microsystems, Inc, Worcester Mass. Magnetic sensors, such as the Hall Effect sensors shown in FIGS. 4, 5, 6, 7, and 8 of the drawings are well known in the art for measuring the position of various types of elements. In the simplest form of Hall Effect sensor, a magnet is used to create a magnetic field which is measured by an integrated circuit containing a magnetically sensitive feature. The magnet is connected to the element to be measured and moves relative to the integrated circuit. The changing magnetic field in the integrated circuit is converted into an output signal proportional to the movement.

The basic theory of operation of Magnetic sensors, such as Hall Effect sensors is discussed in U.S. Pat. No. 3,365,597 issued to Davidson and in U.S. Pat. No. 5,789,917 issued to Oudet, et al. The subject matter of U.S. Pat. Nos. 3,365,597 and 5,789,917 is hereby incorporated herein by reference.

Figure 16:
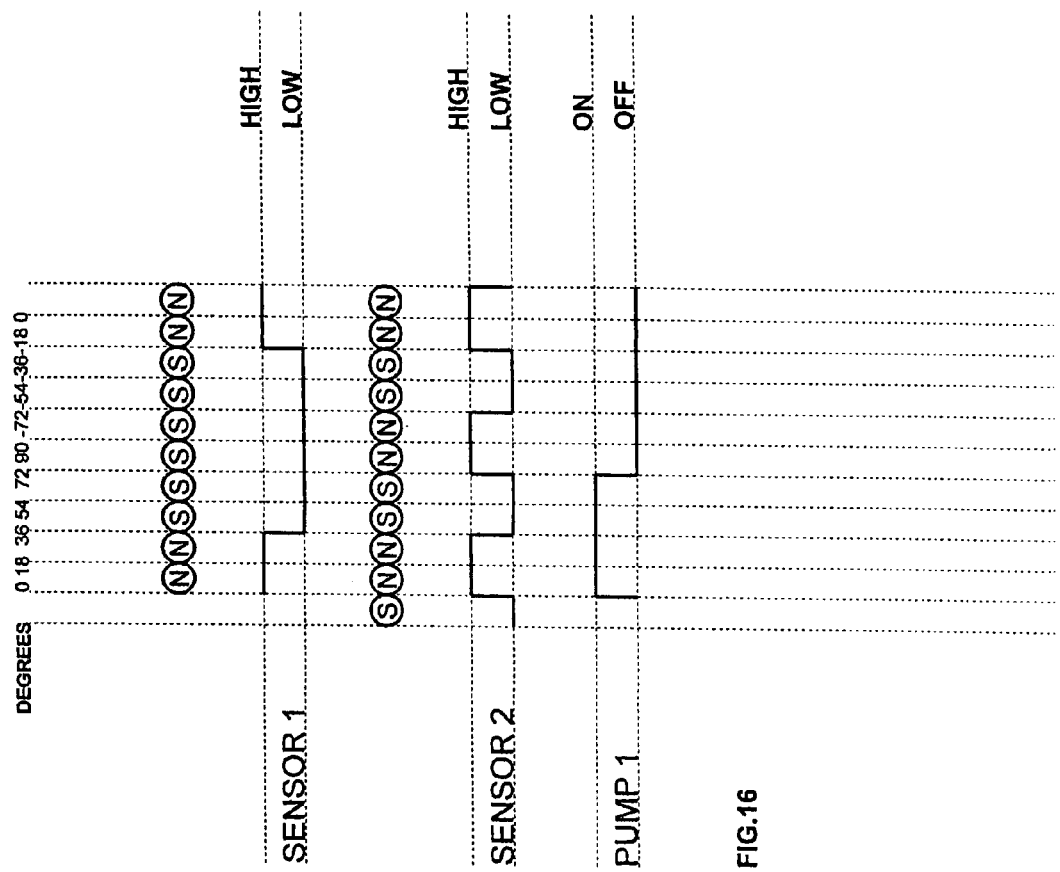
FIG. 16 is a generally schematic view further illustrating the operation of the magnetic-type sensor shown in FIG. 15.

Referring also to FIGS. 15 and 16, the operation of the magnetic-type sensor of the present invention is there illustrated. For ease of illustration, the operation is described relative to a single wiper blade, but it should be appreciated that the second wiper blade operates in a similar fashion. As indicated in the drawings, with the vehicle drive arm 40 in the park position, 0 degrees, the position sensor reads "High" and the clocking sensor reads "Low" (see FIG. 16). In this regard it is to be noted that the sensor 62 normally reads "High" (5 VDC output) until it experiences the proper type of magnetic field strength (gauss level) and flux direction (i.e., north or south pole) at which point it will read "Low" and the output goes to 0 VDC (0.3 VDC bi-polar or nearly 0 VDC for FET output). When the wiper fluid system is activated, the wiper arm will commence its upward motion and, as indicated in FIG. 16, the position sensor will continue to read "High", while the clocking sensor transitions from "Low" to "High" causing the pump "P" to be activated. When the wiper arm reaches 36 degrees, the position sensor transitions from "High" to "Low", while the clocking sensor continues to read "High". As the wiper arm moves past 36 degrees, the clocking sensor transitions from "High" to "Low". The position sensor continues to have no effect on the output unless and until the clocking sensor produces a positive edge transition (i.e., a transition from "Low" to "High"). When the wiper arm reaches 54 degrees, both the position and clocking sensors continue to read "Low". Similarly, when the wiper arm reaches 72 degrees, both sensors continue to read "Low"; but as the wiper arm passes 72°, the clocking sensor will transition from "Low" to "'High" and the pump "P" will be turned off. As indicated in the drawings, the pump will remain off through the entire downward motion of the wiper arm until it returns to the park position (0 degrees) and once again commences its upward motion.

With the construction described in the preceding paragraph and because of the strategic location of the apertures 36 in the washer conduit 26, the washer fluid will flow uniformly onto the surface to be cleaned in advance of the travel of the wiper blade 24 in a manner such that the wiper blade can efficiently clean the surface and prevent impairment of the operator's vision as a result of smearing of foreign materials that may reside on the surface.

Figure 17:
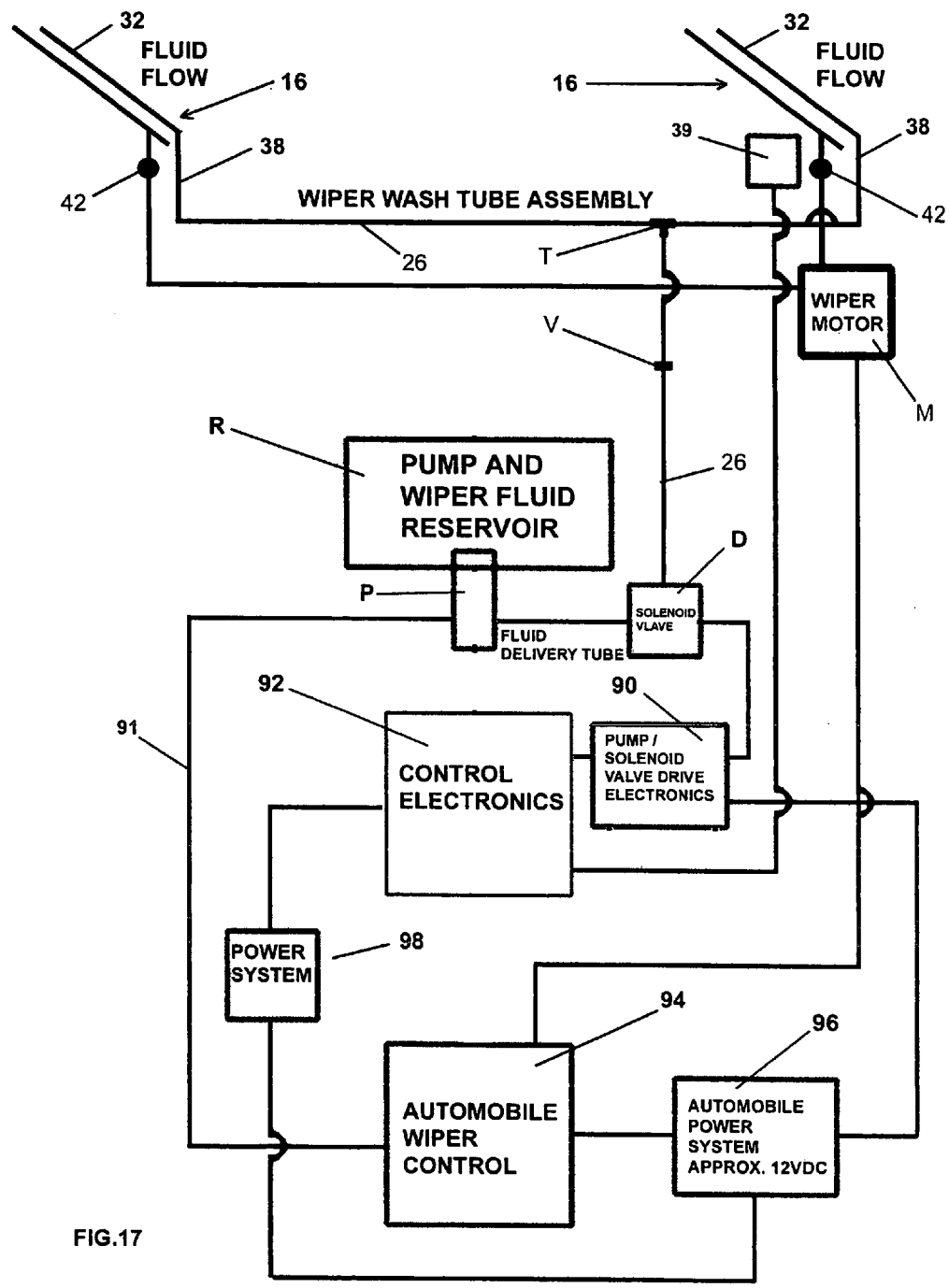
FIG. 17 is a generally schematic view further illustrating the interrelationship among the various components of one form of the apparatus of the invention.

Referring to FIG. 17 of the drawings, this form of the invention, is similar to that shown in FIG. 10 and like numerals will be used in the description of parts. As stated previously, the pump/solenoid valve drive electronics 90 can be placed in series with the automobile wiper wash controls, or can drive the solenoid valve device(s) directly from the automobile power system. In this form of the invention, the pump/solenoid valve drive electronics 90 are independent of the automobile wiper wash controls. The control unit operates a single solenoid device "D" (valve, diverter valve, pinch valve, etc) in order to provide controlled fluid flow through the wiper wash tube assembly and onto the windshield through the wiper arm assembly 16.

Referring next to FIGS. 18 through 22 of the drawings, the interrelationship among the various components of an alternate form of the apparatus of the present invention and the various components of the vehicle with which the apparatus is used is there schematically shown. This alternate form of the apparatus is similar in most respects to that shown in FIGS. 12 through 17 of the drawings and like numerals are used in FIGS. 18 through 22 to identify like components. The major differences between this latest embodiment of the invention and that previously discussed resides in the fact that here the control electronics 93 of the control unit control the operation of two pumps instead of one. By controlling two pumps, the control unit provides fluid flow to the forward of the wiper arm assemblies upward and downward travel. This embodiment of the invention, incorporates a second pump "P-2" and sensor electronics comprising four rather than two sensors. The pump/solenoid valve drive electronics 90 and 90a are placed in series with the existing automobiles wiper wash controls through conduits 91 and 111. This allows the control unit to simply interrupt pump 1, "P-1," and pump 2, "P-2,"

operations to coincide with the information supplied by the control electronics as will be discussed in the paragraphs which follow.

Figure 18:
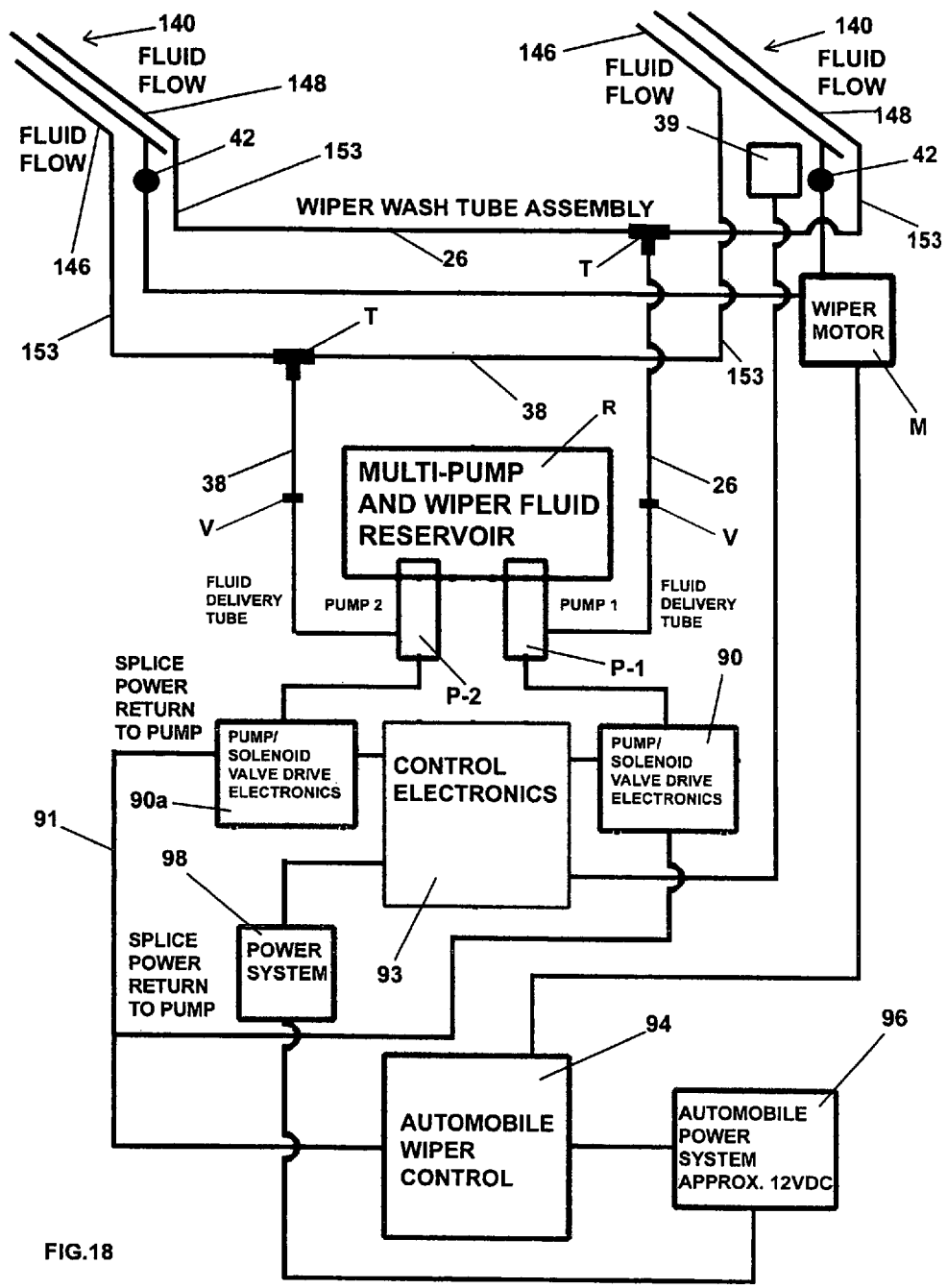
FIG. 18 is a generally schematic view further illustrating the interrelationship among the various components of another form of the apparatus of the invention.

In FIG. 18, the windshield wiper assembly 140, which is of a somewhat different construction from those shown in FIGS. 1 and 1A is shown interconnected with the vehicle wiper motor linkage 42. Similarly, the conduit 26 is shown interconnected with the vehicle pump "P-1" and the conduit 38 is shown interconnected with the additional pump "P-2", which are both connected to the vehicle fluid reservoir. The pump "P-1" is, in turn, interconnected with the pump/solenoid valve drive electronics generally designated by the numeral 90 and the pump "P-2" is interconnected with the pump/solenoid valve drive electronics generally designated by the numeral 90a. In this instance, the pump/solenoid valve drive electronics 90 and 90a are placed in series with the existing automobile wiper control. As before, power system 96 is interconnected with a power system 98, which, in turn, is interconnected with the control electronics 93 and provides power thereto (FIG. 18).

Figure 19:
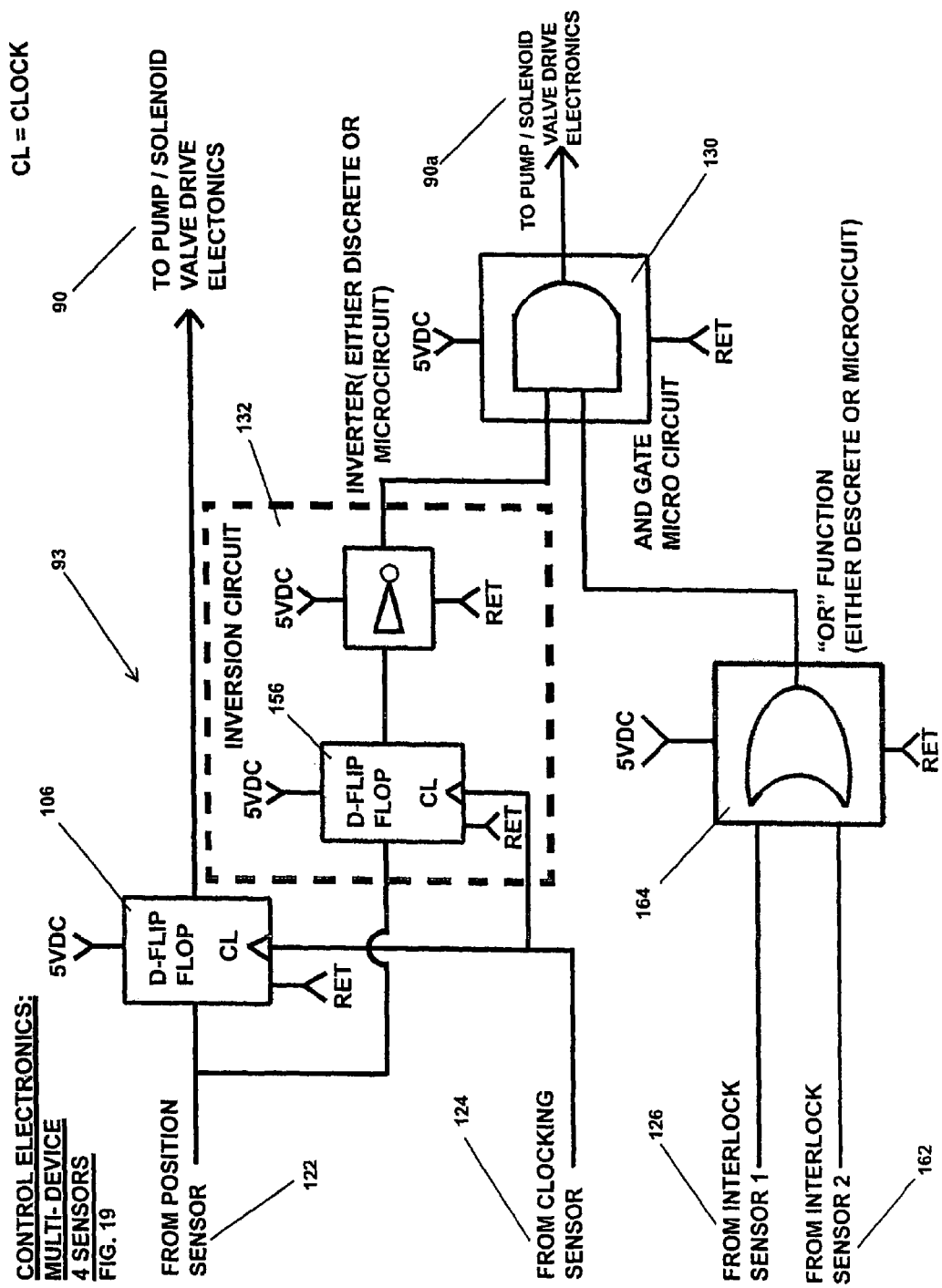
FIG. 19 is a generally schematic view of the four sensor form of the control electronics of the pump control circuit shown in FIGS. 18 and 18A.
Figure 21:
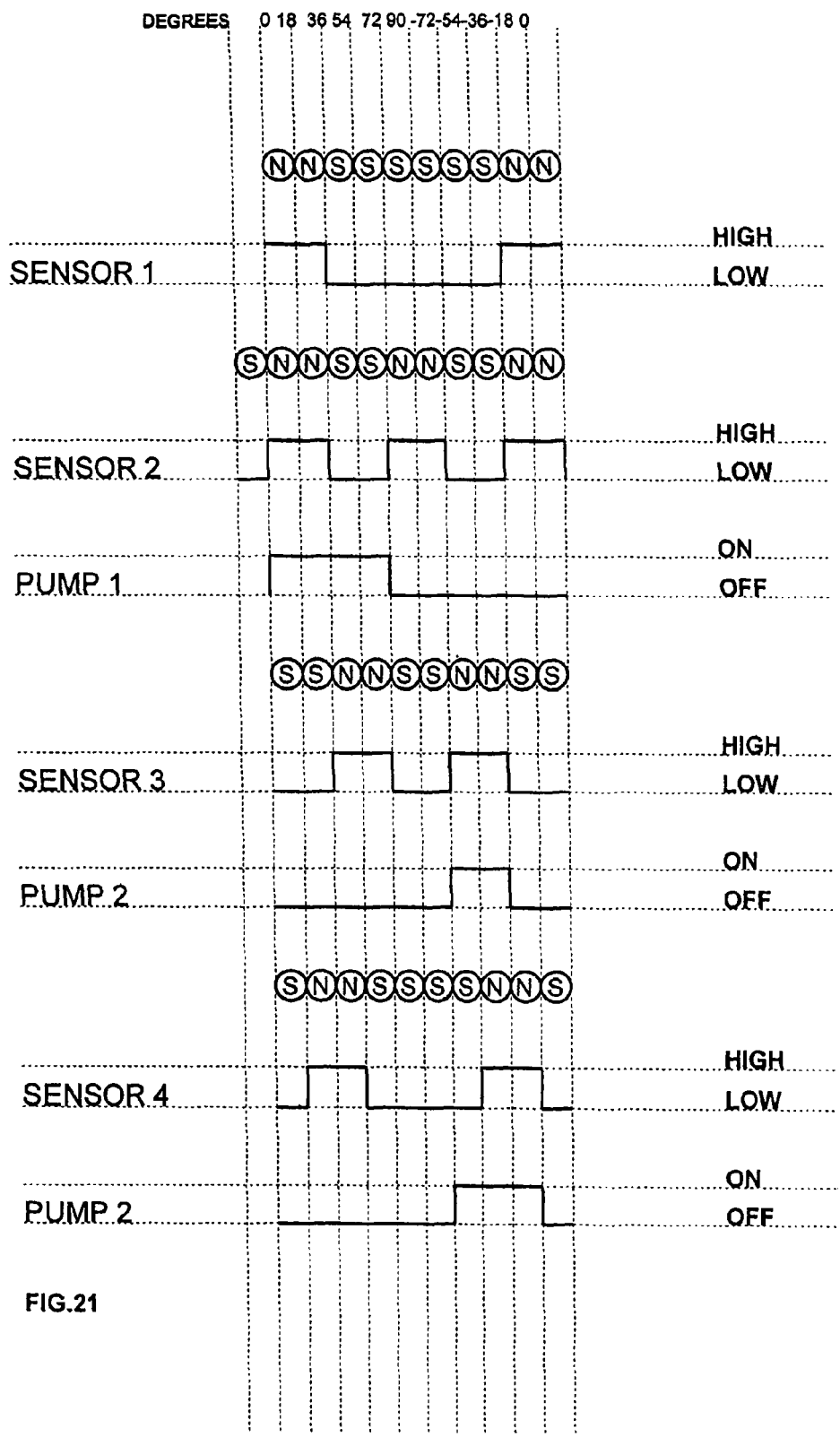
FIG. 21 is a generally schematic view further illustrating the operation of the four sensor-type assembly.

FIG. 18A of the drawings, which is a block diagram somewhat similar to FIG. 18, illustrates the alternate form of the pump control circuit of the invention which embodies four, rather than two sensors. More particularly, the magnetic sensor includes a position sensor 122, a clocking sensor 124, a first interlock sensor 126 and a second interlock sensor 162. It is to be noted, that by using a second interlock sensor 162, the control unit allows the second pump "P-2" to be active an additional 18 degrees past that of just using the first interlock sensor 126 as seen in FIG. 21. As indicated in FIG. 18A, the sensors 122 and 124 of the magnetic sensor are directly interconnected with the control electronics 92, which in-turn is directly connected to the power system 96 and pump/solenoid valve drive electronics 90, which is also connected to the automobile power system. The interlock sensors 126 and 162 are interconnected with the control electronics 92 from a conventional "OR" Function 164 and the "AND" Function 130, which is also directly connected to the pump/solenoid valve drive electronics 90a, through an inversion circuit 132 whose components are seen in FIG. 19. The pump/solenoid valve drive electronics 90a is also directly connected with the automobile power system.

"And" gate 130, "Or" gate 164 and the various resistors and capacitors used in the circuitry of the apparatus are available from numerous sources, including the previously mentioned Digi-Key Corporation.

As illustrated in FIG. 19 of the drawings, the control electronics 93 here comprises a D-Flip Flop 156 that functions to transfer the information from the position sensor 122 to the pump/solenoid valve drive electronics 90. The information from the position sensor 122 is transferred to the output and used by the pump/solenoid valve drive electronics 90 to activate the first pump "P-1". In this embodiment, the first Pump "P-1" is activated almost immediately as the wiper arm assembly commences its upward motion. Uniquely, in this latest form of the invention the four sensors 122, 124, 126, and 162 (position, clocking, first interlock, and second interlock) are used to control the first and second pumps "P-1" and "P-2" and to thereby control fluid flow to the dual tube wiper assembly 140, which is of the character illustrated in FIGS. 22 and 22A of the drawings.

Figures 22, 22A:
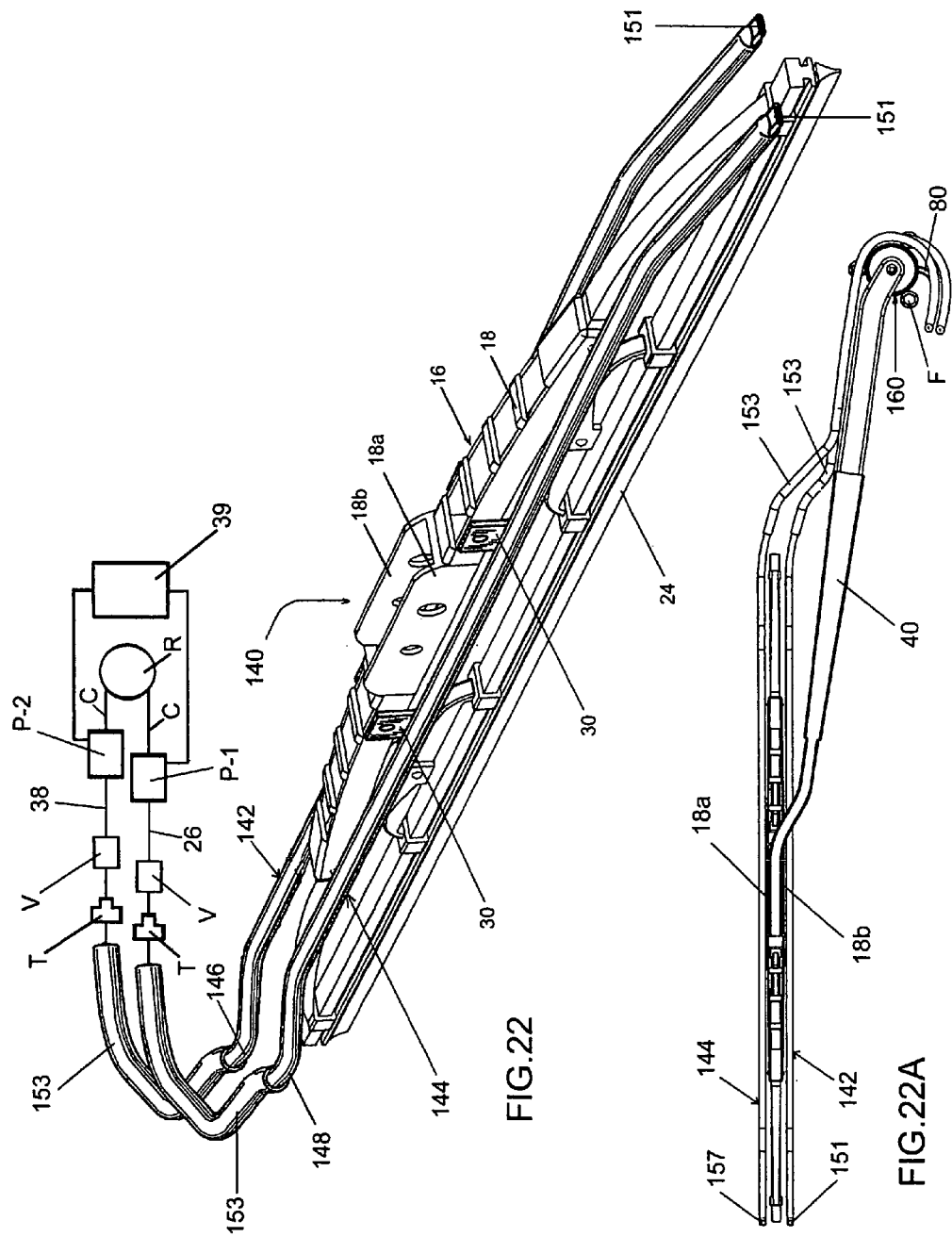
FIG. 22 is a generally perspective, partially diagrammatic, top view of one form of an alternate form of the apparatus of the present invention for sweeping a glass surface on a vehicle.
FIG. 22A is an enlarged, fragmentary, side-elevational view of a portion of the windshield wiper assembly shown in FIG. 22 interconnected with one form of the sensor electronics of the invention.

Dual tube wiper assembly 140 is similar in some respects to the earlier described single wiper assembly 14 and like numerals are used in FIGS. 22 and 22A to identify like components. As previously mentioned, the major difference between this wiper assembly and the previously described wiper assembly resides in the provision of two spaced-apart, apertured feed conduit assemblies 142 and 144 respectively. As in the earlier described embodiment of the invention, the feed conduit assemblies are connected to a structural support 16 by pairs of connector brackets 30 (see FIG. 22). In the present form of the invention the feed conduit assemblies comprise, in addition to brackets 30, a pair of elongated, semi-rigid tubular feed conduits 146 and 148, each having a fluid inlet and a plurality of longitudinally spaced-apart fluid outlets 36 for directing the washer fluid toward the glass surface of the vehicle that is to be cleaned (see also FIG. 2). Each of the feed conduits has a crimped end 151 of the character best seen in FIG. 22. Each of the feed conduit assemblies 142 and 144 further comprises a flexible fluid conduit 153 that is connected to a selected one of the vehicle pumps "P-1" and "P-2" via a conventional check valve "V" that prevents fluid flow in a reverse direction. As indicated in FIG. 22 of the drawings, both of the pumps are interconnected with the vehicle source of windshield washing fluid reservoir "R" by means of the conduits "C".

As is further shown in FIG. 18A, the control electronics also includes a second D-Flip Flop 156, the output of which is inverted when the first Pump "P-1" is activated (High to Low) by an inverter (either discrete or micro-circuit). This action maintains the second Pump "P-2" in a de-activated state during the upward travel of the wiper arm assembly thereby preventing fluid flow to the backside of the wiper via the secondary feed conduit assembly 144. It is to be understood that the state of the position sensor 122 is free to vary with no effect on the output unless the clocking sensor 124 produces a positive edge transition. In this instance, the pump/solenoid valve drive electronics will deactivate the first Pump "P-1" with the second D-Flip Flop 156 going to "Low" and the output of the inverter becoming "High" thereby enabling the "And" gate 130, the output of which drives the pump/solenoid valve drive electronics 90a. This occurs when the wiper assembly has traveled approximately 72° from the park position. However, it is to be noted that the second Pump "P-2" will not be activated unless the interlock sensor 126 and 162 are also activated ("High"). Both pumps "P-1" and "P-2" will remain deactivated until the wiper arm assembly completes its downward travel and makes the transition from the park position into an upward motion.

Figure 20:
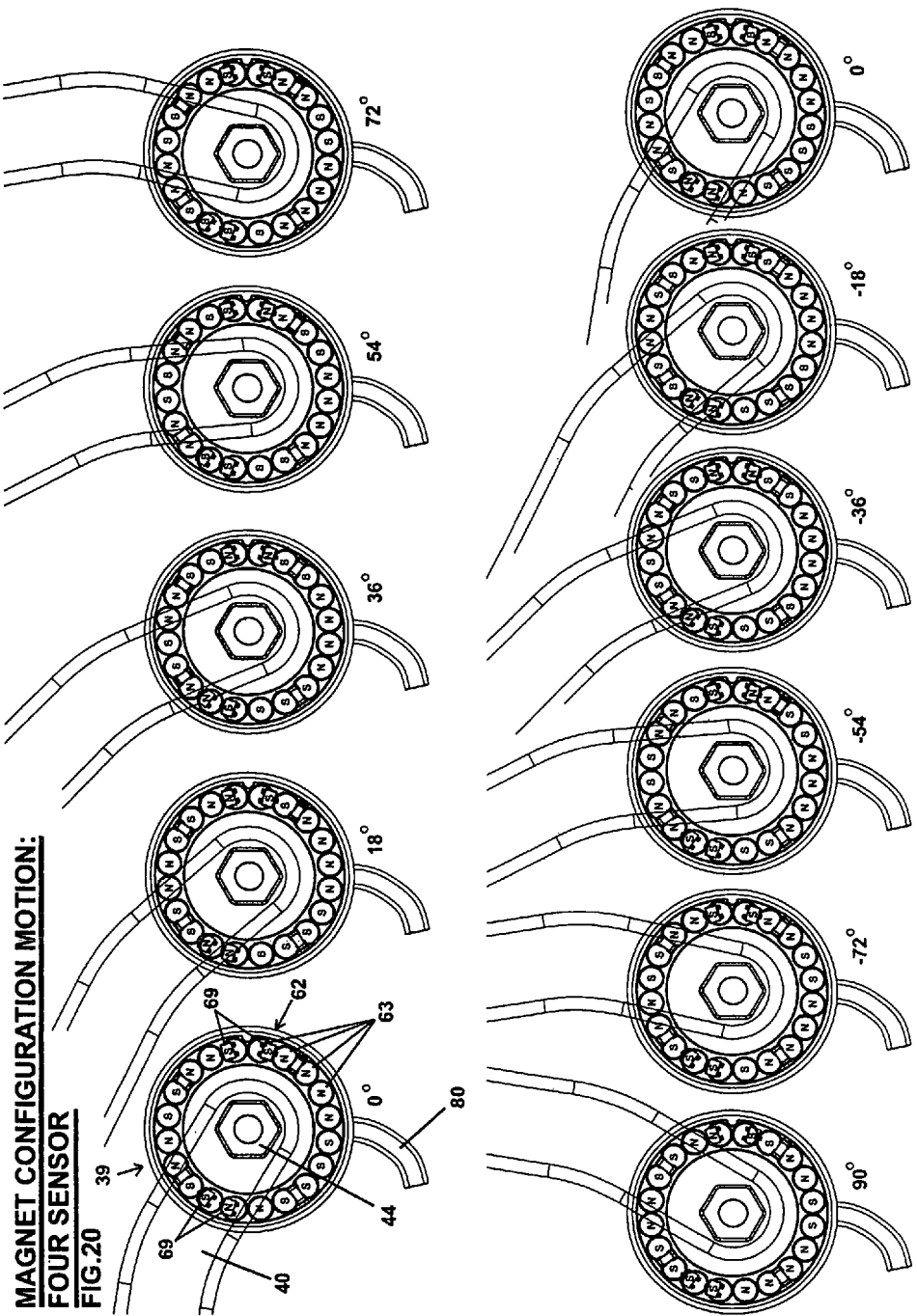
FIG. 20 is a generally diagrammatic view illustrating the operation of an alternate, four sensor-type assembly of the invention.

Referring next to FIGS. 20 and 21, the operation of this latest form of a four magnetic sensor 120 is there illustrated in diagrammatic form and shows movement of the wiper assemblies in 18 degree intervals. This four sensor magnetic sensor system controls the fluid flow toward the dual feed conduits in a manner such that the washer fluid is always dispensed forwardly of the wiper blades. Once again, for ease of illustration, the operation is described relative to a single wiper blade, but it should be appreciated that the second wiper blade operates in a similar fashion. Turning particularly to FIG. 20, with the vehicle drive arm 40 in the park position, 0 degrees, the position sensor 122 reads "High" and the clocking sensor 124 reads "Low" (see FIG. 21).

When the wiper fluid system is activated the wiper arm assembly 140 will commence its upward motion and, as indicated in FIG. 21, the position sensor 122 will continue to read "High", while the clocking sensor transitions from "Low" to "High" causing the pump "P-1" to be activated. When this occurs, the inversion circuit's 132, which consists of a second D-flip flop 156, output is inverted, assuring pump "P-2" is in a deactivated state during the upward travel of the wiper arm. The interlock sensors 126 and 162 remain ineffective until D-flip flop 156 transitions to "Low" and the output of the inverter becomes "High" thereby enabling the "And" gate 130, the output of which drives pump "P-2".

When the wiper arm assembly 140 reaches 36 degrees, the position sensor 122 transitions from "High" to "Low", while the clocking sensor 124 continues to read "High". As the wiper arm moves past 36 degrees, the clocking sensor transitions from "High" to "Low" and the position sensor 122 continues to have no effect on the output unless and until the clocking sensor 124 produces a positive edge transition (i.e., a transition from "Low" to "High").

At the 54 degree position, both the position 122 and clocking 124 sensors continue to read "Low" until the wiper arm assembly 140 reaches 72 degrees. As the wiper arm passes 72°, the clocking sensor 124 will transition from "Low'" to "'High" and the pump "P-1" will be turned off. It is at this point, where the output of the second D-Flip Flop of the inversion circuit reads "Low" and the output of the inverter becomes "High" enabling the "And" gate to relay information to the pump "P-2". The interlock sensors 126 and 162 both reading "Low" at this point, assuring that both pumps "P-1" and "P-2" remain off through the rest of the wiper arm's upward movement. As indicated in the drawings, the pump "P-1" will remain off through the entire downward motion of the wiper arms until it returns to the park position (0 degrees) and once again commence their upward motion.

At 90 degrees, the point where the wiper arm assembly begins its downward motion, both interlock sensor 126 and second interlock sensor 162 continue to read "Low" and pump "P-2" will remain off (FIG. 21). At about the same 72 degree point where pump "P-1" was shut off, the first interlock sensor 126 will transition to "High" causing pump "P-2" to be activated. 18 degrees past pump "P-2" activation, we'll call this the 54 degree point, the first interlock sensor 126 continues to read "High" and the second interlock sensor 162 readies its transition from "Low" to "High" and pump "P-2" remains on.

As the wiper arm passes through the 36° point, the interlock sensor 126 will transition from "High" to "Low'", while interlock sensor 162 remains "High" enabling pump "P-2" to be activated. Interlock sensors 162 transition from "High" to "Low" at the 18 degree position, and will turn-off pump "P-2", and begin the process once again at the 0 degree park position.

With the construction described in the preceding paragraph and because of the strategic location of the apertures 36 in the washer conduits, the washer fluid will flow uniformly onto the surface to be cleaned in advance of the upward travel of the wiper blades in a manner such that the wiper blades can efficiently clean the surface and prevent impairment of the operator's vision as a result of smearing of foreign materials on the surface.

Figure 21A:
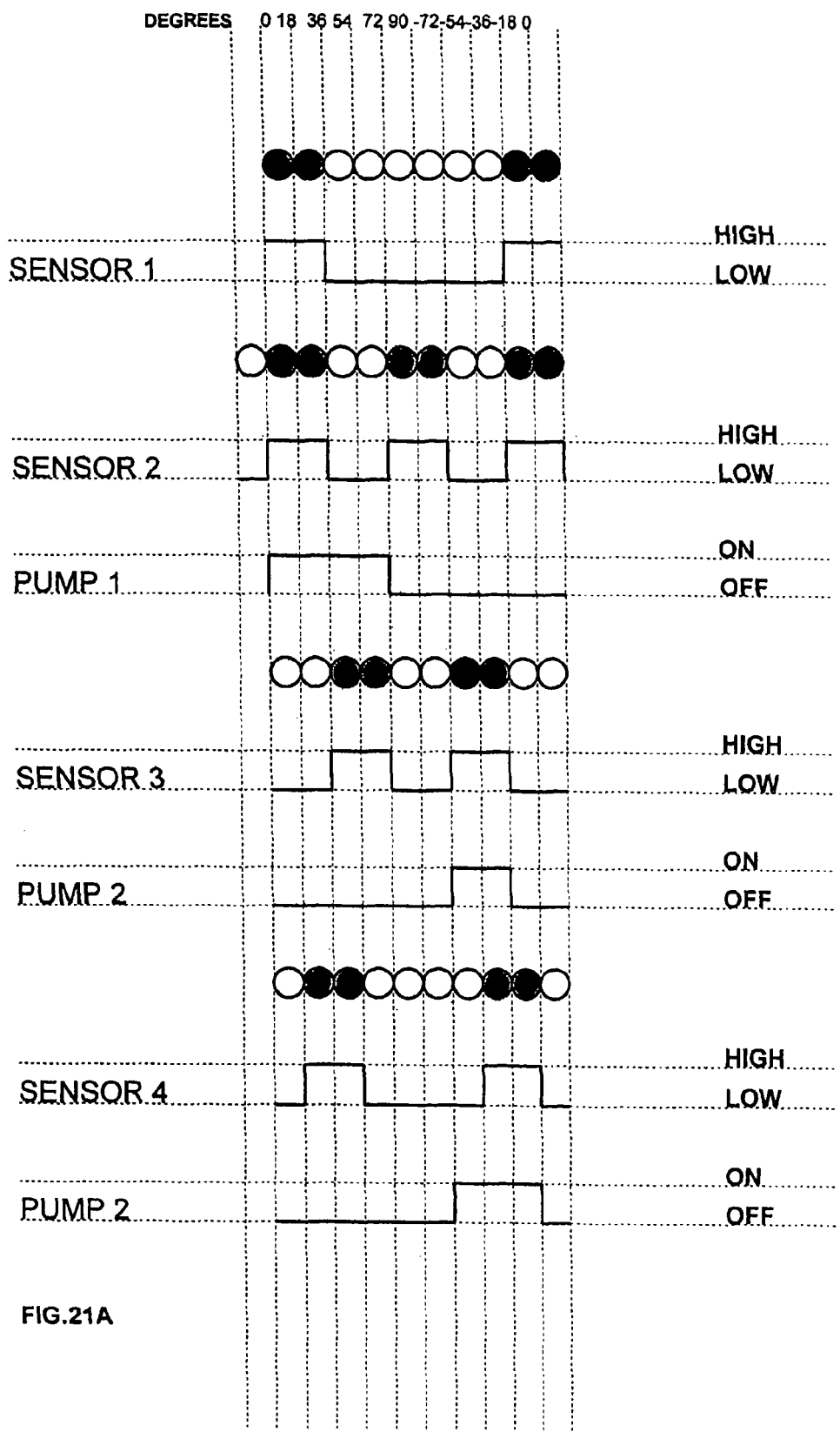
FIG. 21A is a generally schematic view still further illustrating the operation of the four sensor-type assembly.
Figure 21B:
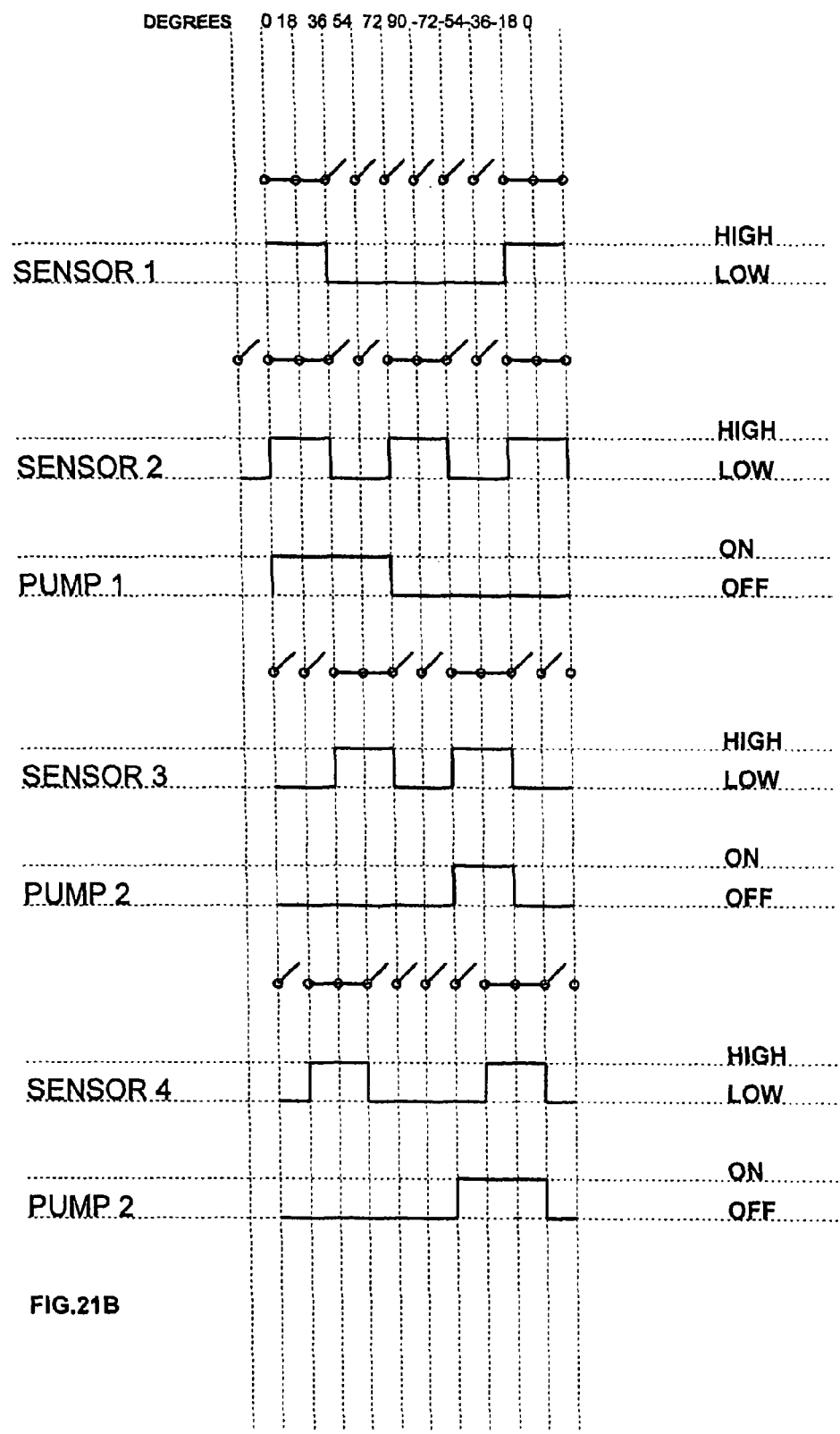
FIG. 21B is a generally schematic view still further illustrating the operation of the four sensor-type assembly.

It is to be noted that in the operation of the control means as described in the preceding paragraphs and as depicted in FIGS. 21, 21A and 21B, each sensor used in the control assembly, whether it is Magnetic FIG. 21, Optical FIG. 21A, and or micro-Switch FIG. 21B, operates as a state switch, i.e. "High" or "Low". More particularly, the Hall Effect sensors included in the magnetic control assemblies basically comprise a state switch that is normally "High" (5 VDC output) until it experiences the proper type of magnetic field strength (gauss level) and flux direction, (i.e., north or south pole), at which point it goes "Low" and the output goes to ~0 VDC (0.3 VDC bi-polar or nearly 0 VDC for FET output).

Figure 23:
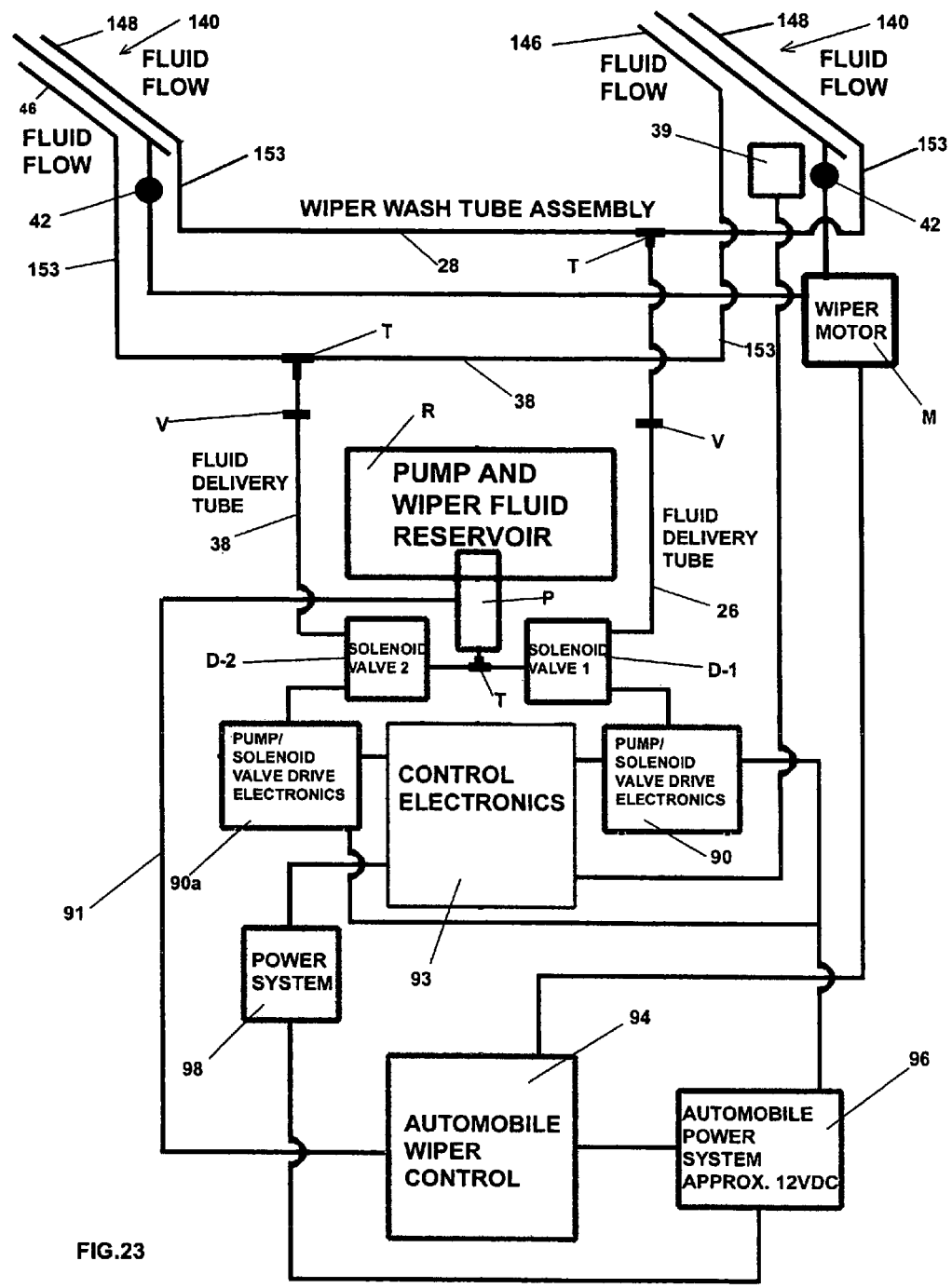
FIG. 23 is a generally schematic view further illustrating the interrelationship among the various components of one form of the apparatus of the invention.

Referring to FIG. 23 of the drawings, the form of the invention there shown is similar to that shown in FIG. 18 and like numerals will be used in the description of parts. As stated previously, the pump/solenoid valve drive electronics 93 can be placed in series with the automobile wiper wash controls, or can drive the solenoid valve device(s) directly from the automobile power system. In this form of the invention, the pump/solenoid valve drive electronics 93 are independent of the automobile wiper wash controls. The control unit 39 operates two solenoid devices, "D-1" and "D-2" (valve, diverter valve, pinch valve, etc), which can be purchased from Asco Scientific of Florham Park, N.J., in order to provide controlled fluid flow through the wiper wash tube assembly and onto the windshield through the wiper arm assembly 140.

Referring to FIGS. 24 through 27, an alternate form of the control unit of the invention is there shown and generally identified by the numeral 230. Unit 230 is similar in some respects to the earlier described embodiments of the invention and like numerals are used in FIGS. 24 through 26 to identify like components. The major difference between this unit and that previously described resides in the provision of an optical sensing means, rather than a magnetic sensing means. The alternate form of control means, which comprises the optical-type sensor depicted in FIG. 25, is similar in some respects to the previously described magnetic sensor-type control means and comprises a splined tapered portion 232 that drivably mates with a drive arm grooved driven portion of the character shown in FIG. 3A and there designated as 40a. The drive arm 40 is held in position on the drive shaft in a conventional manner by means of a nut 44 in FIG. 24A. As before, the drive motor linkage 234 can either be a specially fabricated unit that forms a part of the control unit of the invention, or, in the alternative, can comprise a standard automobile wiper arm drive unit.

Figures 24, 24A:
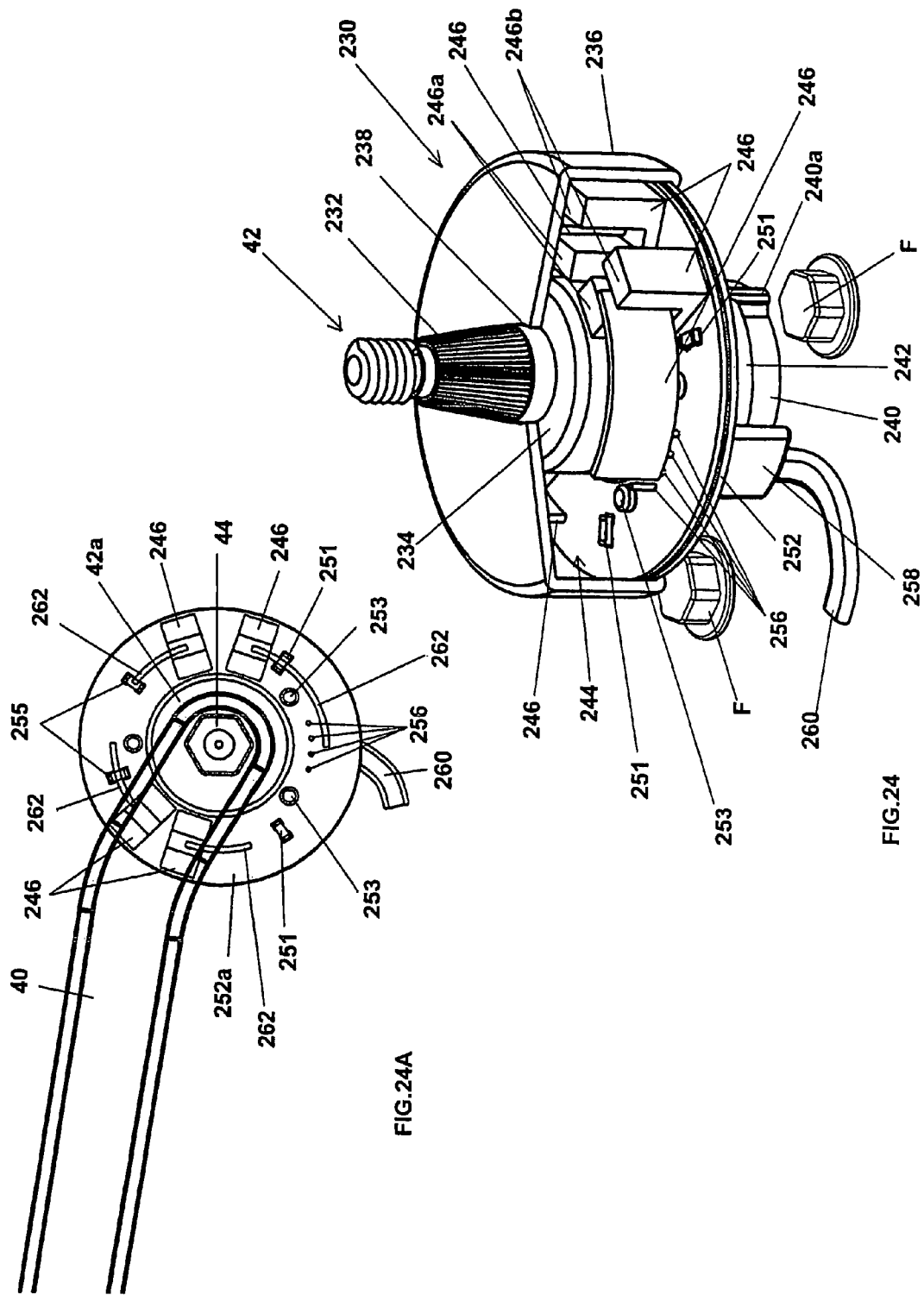
FIG. 24 is a generally perspective view showing still another form of control unit of the invention mated with the windshield wiper drive motor linkage and partly broken-away to show internal construction.
FIG. 24A is a fragmentary, top plan view of a portion of the windshield wiper assembly shown in FIG. 24 illustrating the interrelated optical sensor components of this latest form of the apparatus of the invention.

The control unit 230 of this latest form of the invention is mounted within the vehicle in a similar manner to the previously described method of mounting of the magnetic sensor-type control unit. As indicated in FIG. 24, in the present form of the invention, the control unit 230 comprises an optical shield housing 236 that includes an axial opening 238, which is adapted to telescopically receive the drive shaft 234 of the drive motor linkage 240 in the manner illustrated in the drawings. Unit 230 also includes a keyed sensor base 252 that has a skirt 242 which is provided with a plurality of circumferentially spaced locking slots 242a that receive the circumferentially spaced locking ribs 240a of the drive motor linkage 240. Referring particularly to FIGS. 24 and 24A, it is to be observed that the optical sensing means of this latest form of the invention for sensing the position of the windshield wiper assembly is housed within a chamber 244 created by optical shield housing 236 and keyed sensor base 252. As before, this important optical sensing means functions to sense the position of the wiper blade and to then appropriately activate one or more pumps. As was true with the magnetic sensing means, when controlling a single pump "P" only two sensors are required, and when controlling two pumps "P-1" and "P-2", four sensors are required.

FIGS. 24 and 24A show the construction of four circumferentially spaced, readily commercially available optical sensors 246. Each of the optical sensors 246 includes spaced-apart, upstanding leg portions 246a and 246b, one of which houses a conventional photo diode 249 and the other of which houses a conventional photo transistor 250 (see FIG. 25), the function of which will presently be described. Optical sensors 246 along with their related operating hardware are commercially available from various sources, including Optek, Inc. of Carrolton, Tex. The details of construction and operation of these important sensors can be obtained from Optek, Inc. In the manner illustrated in FIGS. 24 and 24A, optical sensors 246, along with a plurality of circumferentially spaced capacitors 251 and resistors 255, are mounted on an optical sensor board 252a. Sensor board 252a is interconnected with a sensor board base 252 by means of appropriate fasteners 253.

As seen in FIG. 24, a plurality of sensor board pin connectors 256 extend through openings provided in the sensor board and the sensor board base. Pin connectors 256 are adapted to be telescopically received within pin receiving openings provided in a conventional sensor board connector 258. Sensor board connector 258 is adapted to be operably interconnected with the control electronics of the control unit in a conventional manner by means of an elongated connector cable 260. The details of the construction and operation of the control electronics of the control unit were previously discussed in connection with the description and operation of the magnetic-type control unit.

Forming an important aspect of the sensor electronics of this latest form of the invention is the provision of a plurality of circumferentially spaced optical shields 262 that rotate with the wiper drive, while the optical sensors remain stationary. As illustrated in the drawings, as the wiper motor drive rotates causing the wiper blades to travel upwardly and downwardly, the optical shields move from a first, non-blocking position to a second blocking position intermediate to the upstanding leg portions 246a and 246b of the sensors 246 in a manner to interrupt the "light" beam (photons, IR, etc.) emitted by the photo diodes.

The sensor electronics of this latest form of the invention comprises the previously mentioned conventional photo diode 249 that is operably associated with the conventional photo transistor 250, which, in turn, is operably associated with a conventional pull-up resistor 264. When powered, the photo diode 249 emits photons that bias the photo transistor 250 to the "on" position which means the transistor is in saturation. When in saturation, the output is "low" or ~0 vdc (0.3 VDC bi-polar or nearly 0 VDC for FET output). When the photo transistor is not biased or saturated by the photo diode, the output is "high" or about 5 VDC. The means by which the sensor is turned on and off is accomplished through the use of the previously mentioned light shields 262. In this way the photo transistors replace the magnetic sensors (FIG. 14) of the sensor electronics in the relaying of position information of the wiper assembly 119 (FIG. 18) to the control electronics 93 (when using four sensors and wiper assembly 16 (FIG. 10) and control electronics 92 (FIG. 12) when using two sensors) which control pumps "P-1" and "P-2" in the manner previously described so that the washer fluid is always dispensed forwardly of the wiper blades.

Figures 26, 26A:
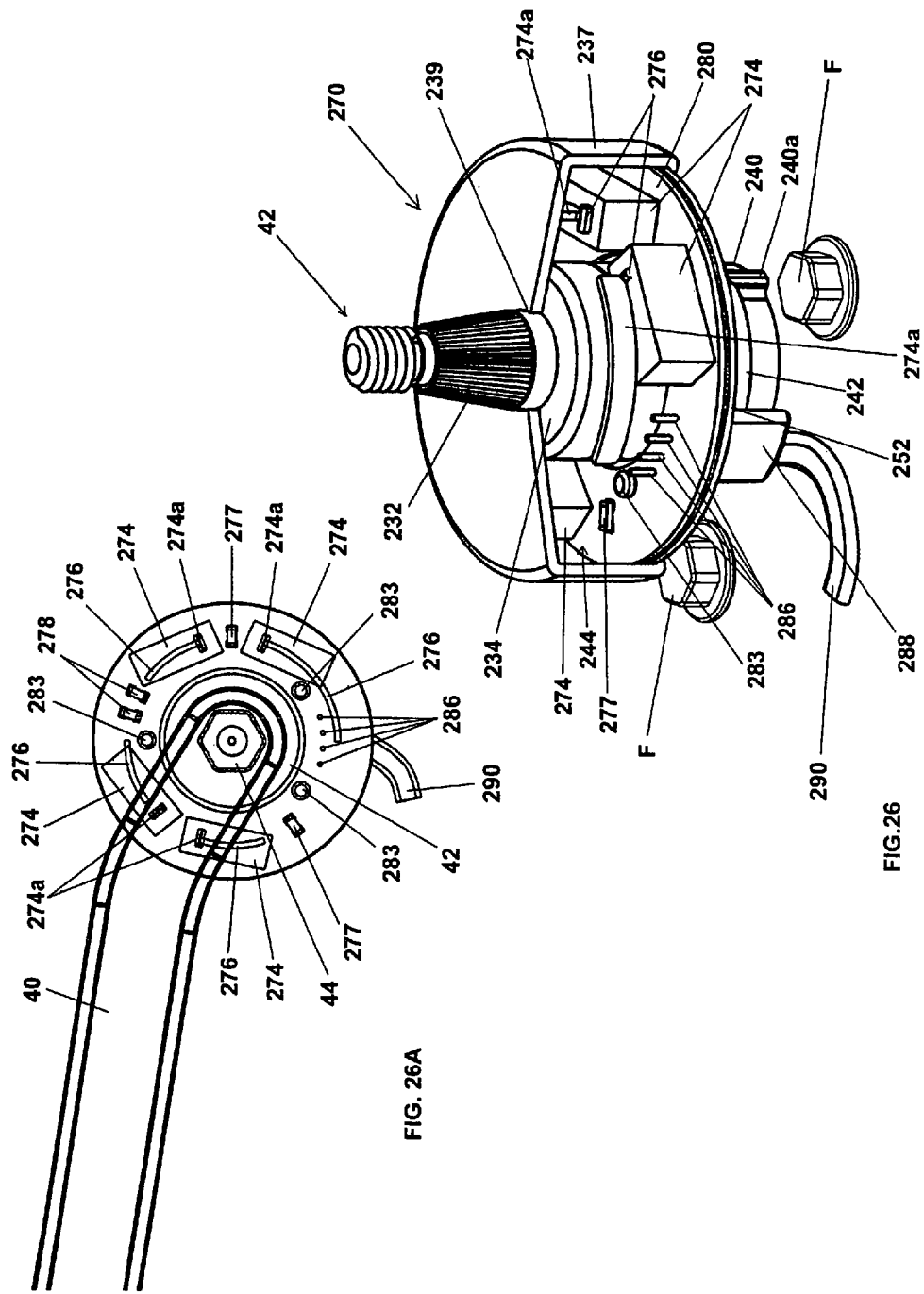
FIG. 26 is a generally perspective view showing still another form of control unit of the invention mated with the windshield wiper drive motor linkage and partly broken-away to show internal construction.
FIG. 26A is a fragmentary, top plan view of a portion of the windshield wiper assembly shown in FIG. 26 illustrating the interrelated components of this latest form of the apparatus of the invention.

Referring to FIGS. 26 through 26A, still another alternate form of control unit of the invention is there shown and generally identified by the numeral 270. Unit 270 is similar in many respects to the embodiment of the invention shown in FIGS. 24 through 24A and like numerals are used in FIGS. 24 through 27 to identify like components. The major difference between this embodiment and that previously described resides in the provision of a mechanical, micro-switch-type sensing means, rather than an optical sensing means. The alternate form of control means is similar in some respects to the previously described optical sensor-type control means and comprises a splined, tapered portion 232 that drivably mates with a drive arm grooved, driven portion of the character shown in FIG. 5 and there designated as 40a. The drive arm 40 is held in position on the drive shaft in a conventional manner by means of a nut 44. As before, the drive motor linkage 240 can either be a specially fabricated unit that forms a part of the control unit of the invention, or, in the alternative, can comprise a standard automobile wiper arm drive unit.

Unit 270 of this latest form of the invention is mounted within the vehicle in a manner similar to the previously described method of mounting the magnetic-type sensor-type unit. As indicated in FIG. 26, unit 270 here comprises a cam actuating housing 237 that includes an axial opening 239 which is adapted to telescopically receive the drive shaft 234 of the drive motor linkage 240 in the manner illustrated in the drawings. Unit 270 also includes a keyed sensor base 252 that has a skirt 242 which is provided with a plurality of circumferentially spaced locking slots 242a that receive the circumferentially spaced locking ribs 240a of the drive motor linkage 240.

Referring particularly to FIGS. 26 and 26A, it is to be observed that the sensing means of this latest form of the invention for sensing the position of the windshield wiper assembly is housed within a chamber 244 formed within cam actuating housing 237 and keyed sensor base 252. As was true with the magnetic sensing means and optical sensing means, when controlling a single pump "P" two sensors are required, and when controlling two pumps, "P-1" and "P-2," four sensors are required. FIGS. 26 and 26A show the embodiment that includes four circumferentially spaced, readily commercially available micro-switches 274. Each of the micro-switches 274 includes an upstanding cam-engaging plunger 274 that can be activated by a cam member 276, the function of which will presently be described. Micro-switches 274, along with their related operating hardware are commercially available from various sources, including Digi-Key Corporation of Thief River Falls, Minn. The details of construction and operation of these micro-switches can be obtained from Digi-Key Corporation. In the manner illustrated in FIGS. 26 and 26A, micro-switches 274, along with a plurality of circumferentially spaced capacitors 277 and resistors 278, are mounted on a mechanical sensor board 280. Sensor board 280 is interconnected with a sensor board base 252 by means of appropriate fasteners 283.

As seen in FIG. 26, a plurality of sensor board pin connectors 286 extend through openings provided in the sensor board and the sensor board base. Pin connectors 286 are adapted to be telescopically received within pin receiving openings provided in a conventional sensor board connector 288. Sensor board connector 288 is adapted to be operably interconnected with the control electronics of the control unit 270 in a conventional manner by means of an elongated connector cable 290. The details of the construction and operation of the control electronics of the control unit are shown in FIG. 27 and will be described further in the paragraphs which follow.

Forming an important aspect of the sensor electronics of this latest form of the invention is the provision of a plurality of activating cam members 276 that rotate with the wiper drive while the micro-switches remain stationary. As illustrated in the drawings, as the wiper motor drive rotates causing the wiper blades to travel upwardly and downwardly, the activating cam members 276 selectively engage the previously identified cam-engaging plungers 274a in a manner to selectively operate the micro-switches 274.

Turning to FIG. 27, the sensor electronics of the control unit of this latest form of the invention are there schematically shown to comprise, in addition to the micro-switch 274, a conventional pull-up resistor 294. When the micro-switch cam-engaging plungers 274a are depressed by the cam members 276 FIG. 27, the switches have a "high" output of about 5 VDC and, when the plungers are not depressed, have a "low" output or 0 VDC. In this way the micro-switches replace the previously described magnetic sensors and optical sensors of the apparatus in the relaying of position information of the wiper assembly 119 to the control electronics 93 (when using four sensors and wiper assembly 16 and control electronics 92 when using two sensors) which control pumps "P-1" and "P-2" in the manner previously described so that the washer fluid is always dispensed forwardly of the wiper blades.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

We claim:

1. A novel control system relating to a washing apparatus for washing a glass surface on a vehicle having a windshield wiper drive arm movably upwardly and downwardly relative to the glass surface, a fluid reservoir and a pump, which upon being energized, pumps fluid from the fluid reservoir, said washing apparatus comprising:
    (a) windshield washer assembly connected to the windshield wiper drive arm for controllably dispensing washer fluid onto the glass surface of the vehicle; and
    (b) control means carried by the vehicle for controllably dispensing liquid from the windshield washer means immediately in advance of the direction of travel of said windshield washer means, said control means comprising sensor means operably associated with the pump for sensing the position of the wiper arm as it moves upwardly and downwardly relative to the glass surface and for energizing the pump based on the sensed position and direction of motion of said wiper drive arm, said sensor means comprising a magnetic sensor, said magnetic sensor comprising a plurality of circumferentially spaced disc magnets.

2. The washing apparatus as defined in claim 1, in which said control means further comprises a Hall Effect sensor operably associated with said plurality of circumferentially spaced disc magnets.

3. A washing apparatus for washing a glass surface on a vehicle having a windshield wiper drive arm, a fluid reservoir and a pump, which upon being energized, pumps fluid from the reservoir, said washing apparatus comprising:
    (a) windshield washer means connected to the windshield wiper drive arm for controllably dispensing washer fluid onto the glass surface of the vehicle, said windshield washer means comprising:
        (i) a wiper blade assembly, including a wiper blade; and
        (ii) a washer assembly operably associated with said wiper blade assembly, said washer assembly comprising a feed conduit having a fluid inlet and at least one fluid outlet for directing fluid toward the glass surface of the vehicle; and
    (b) control means carried by the vehicle for controllably dispensing liquid from the windshield washer means immediately in advance of the direction of travel of said windshield washer means, said control means comprising:
        (i) a drive motor connected to the windshield wiper drive arm for moving the drive arm upwardly and downwardly relative to the glass surface; and
        (ii) sensor means operably associated with the pump for sensing the position of the wiper arm as it moves upwardly and downwardly relative to the glass surface and for energizing the pump based on the sensed position and direction of motion of said wiper drive arm, said sensor means comprising a magnetic sensor, said magnetic sensor comprising a plurality of circumferentially spaced disc magnets.

4. The washing apparatus as defined in claim 3, in which said control means further comprises a Hall Effect sensor operably associated with said plurality of circumferentially spaced disc magnets.

* * * * *